(12) United States Patent
Ota et al.

(10) Patent No.: US 6,195,495 B1
(45) Date of Patent: Feb. 27, 2001

(54) OPTICAL TRANSMITTING MEMBER-HOLDING STRUCTURE

(75) Inventors: Takashi Ota, Kasugai; Masashi Fukuyama, Komaki; Hironori Kurimoto, Konan, all of (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/007,730

(22) Filed: Jan. 15, 1998

(30) Foreign Application Priority Data

Jan. 17, 1997 (JP) .................................................. 9-005960
Feb. 7, 1997 (JP) .................................................. 9-038607

(51) Int. Cl.⁷ .................................................. G02B 6/36
(52) U.S. Cl. .......................... 385/137; 385/65; 385/71; 385/83; 385/89
(58) Field of Search .................... 385/65, 71, 80, 385/83, 137, 49, 89

(56) References Cited

U.S. PATENT DOCUMENTS

| 4,488,773 | * 12/1984 | Wagner | 385/12 |
|---|---|---|---|
| 5,412,748 | 5/1995 | Furuyama et al. | 385/92 |
| 5,647,042 | * 7/1997 | Ochiai et al. | 385/88 |
| 5,764,833 | * 6/1998 | Kakii et al. | 385/65 |
| 5,793,914 | * 8/1998 | Sasaki | 385/49 |
| 5,889,914 | * 3/1999 | Gentsu | 385/65 |

FOREIGN PATENT DOCUMENTS

| 0 645 651 | 3/1995 | (EP) . |
|---|---|---|
| 2-120707 | 5/1990 | (JP) . |
| 5-264868 | 10/1993 | (JP) . |
| 8-015550 | 1/1996 | (JP) . |
| 61-273502 | 12/1996 | (JP) . |

* cited by examiner

Primary Examiner—Hemang Sanghavi
(74) Attorney, Agent, or Firm—Burr & Brown

(57) ABSTRACT

An optical transmitting member-holding structure for holding an optical transmitting member at a given location, said holding structure comprising a holding substrate, an optical transmitting member placed on the holding substrate, a fixing substrate covering the optical transmitting member on the holding substrate, and a joining layer joining the holding substrate and the fixing substrate and fixing the optical transmitting member at said given location, said joining layer comprising an eutectic solder layer.

15 Claims, 21 Drawing Sheets

FIG_1a
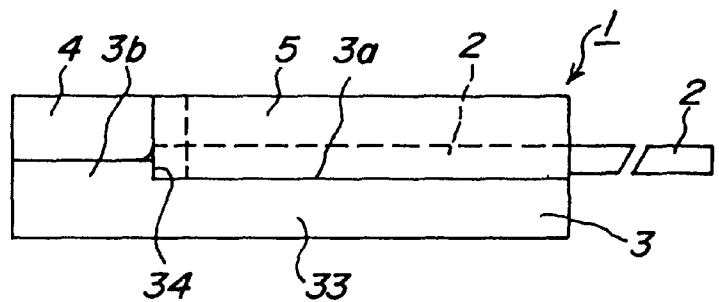
FIG_1b
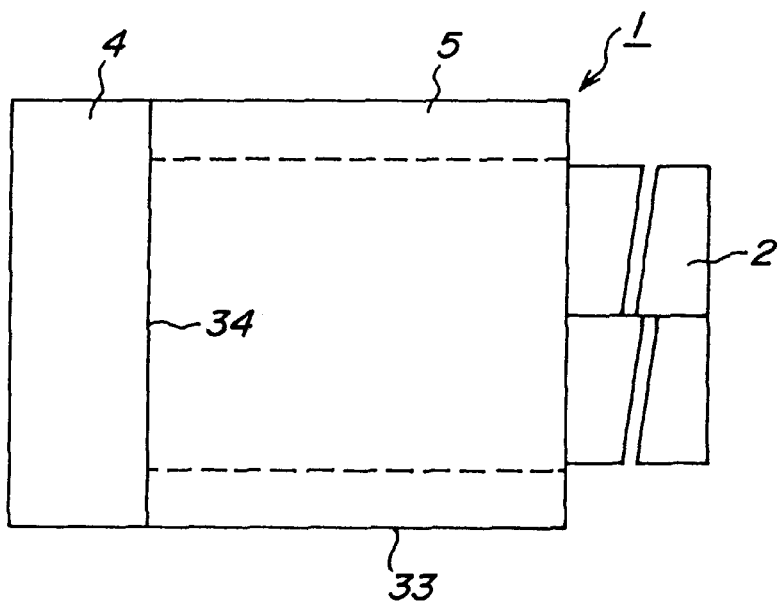
FIG_1c
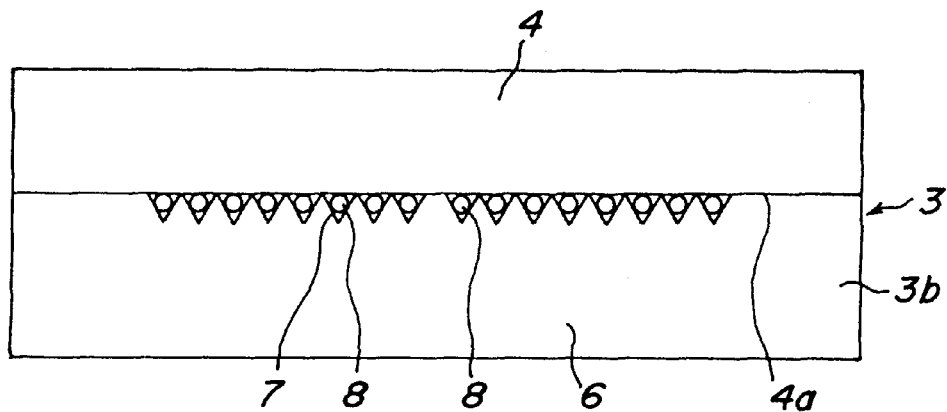

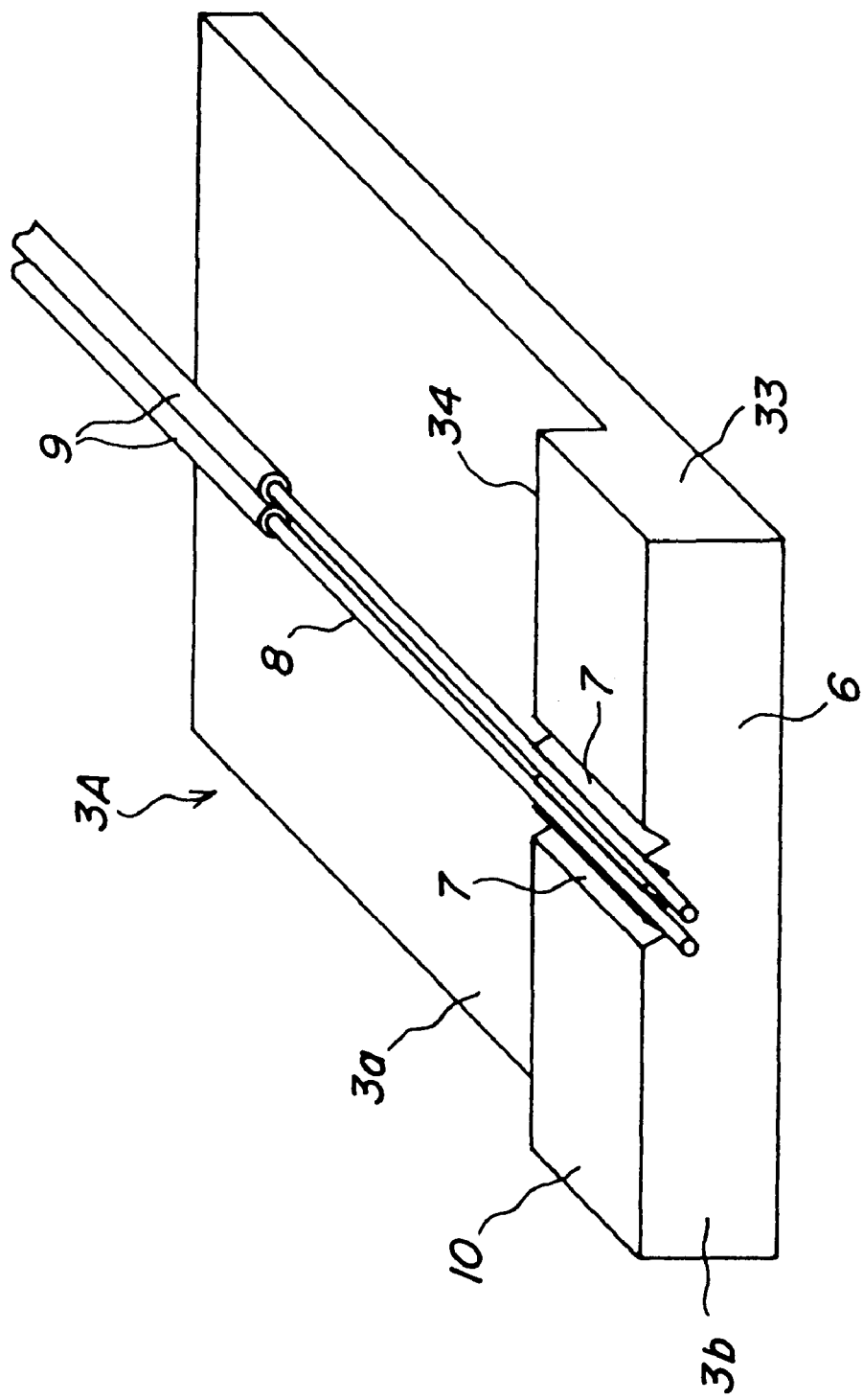

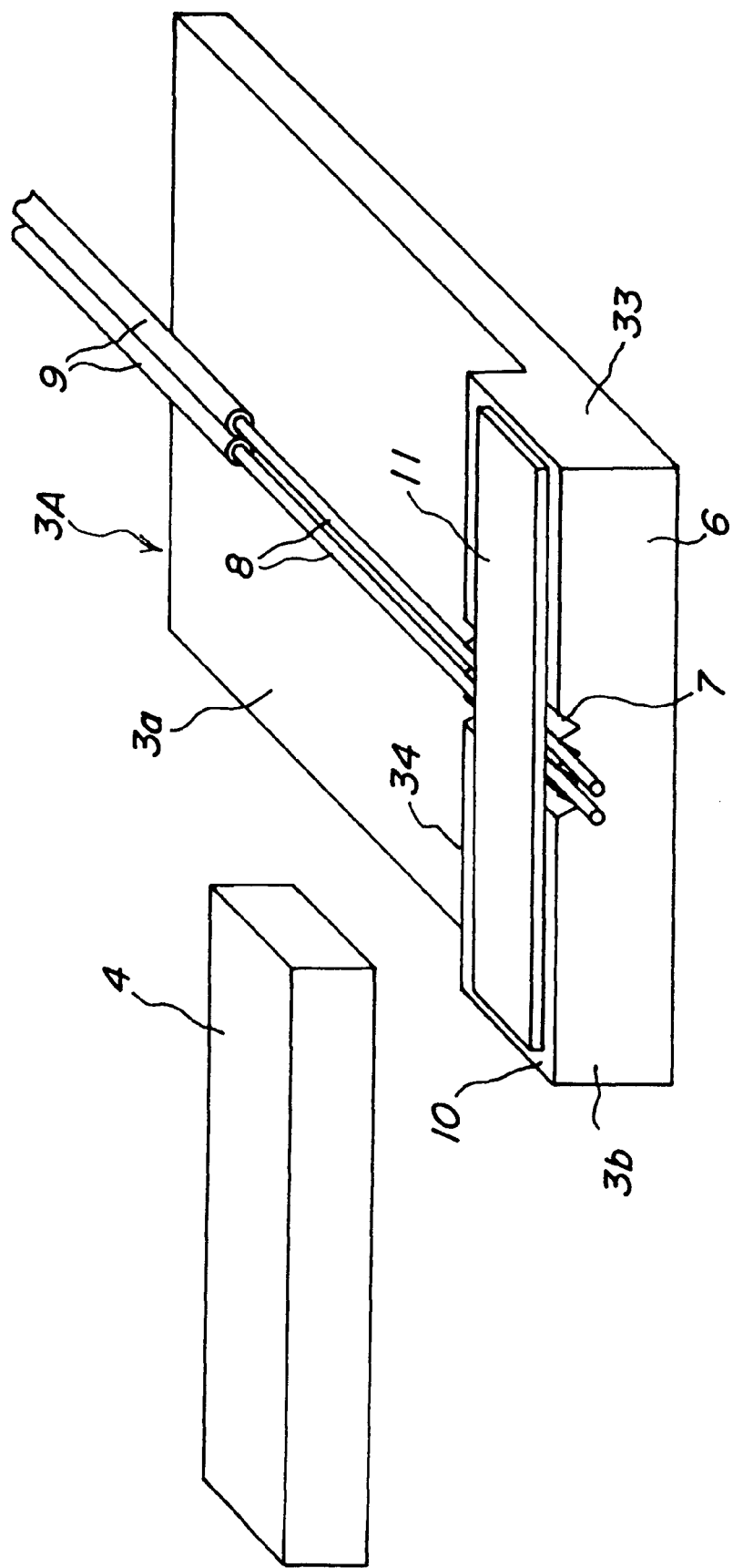

FIG_12

FIG_15a
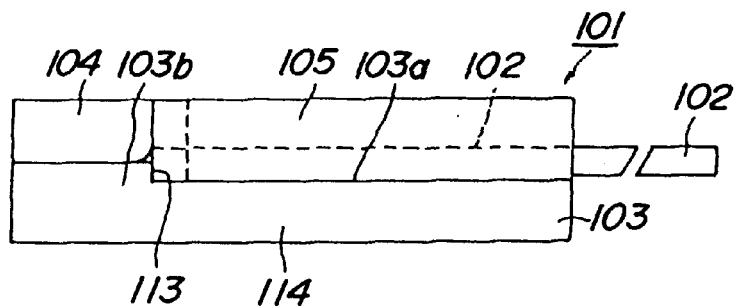
FIG_15b
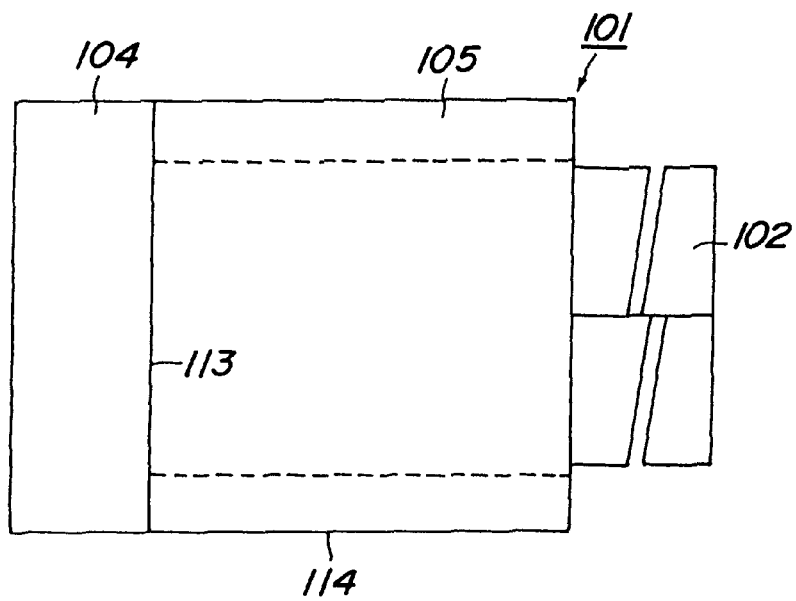
FIG_15c
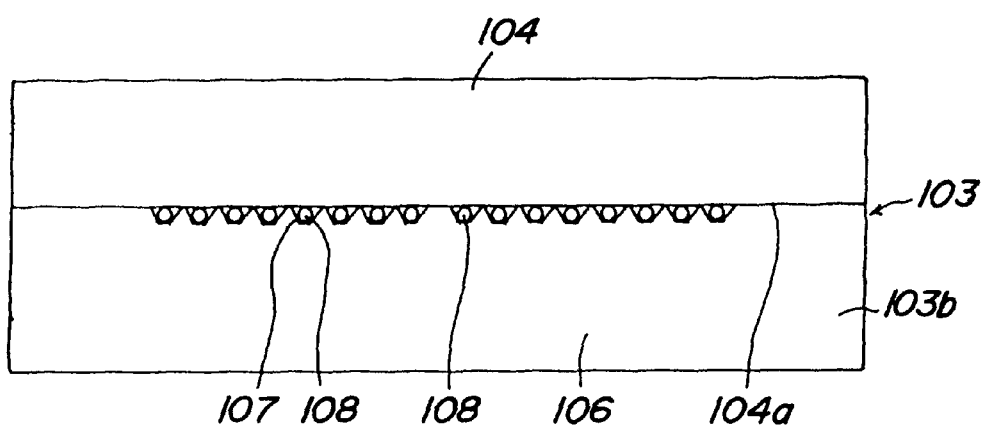

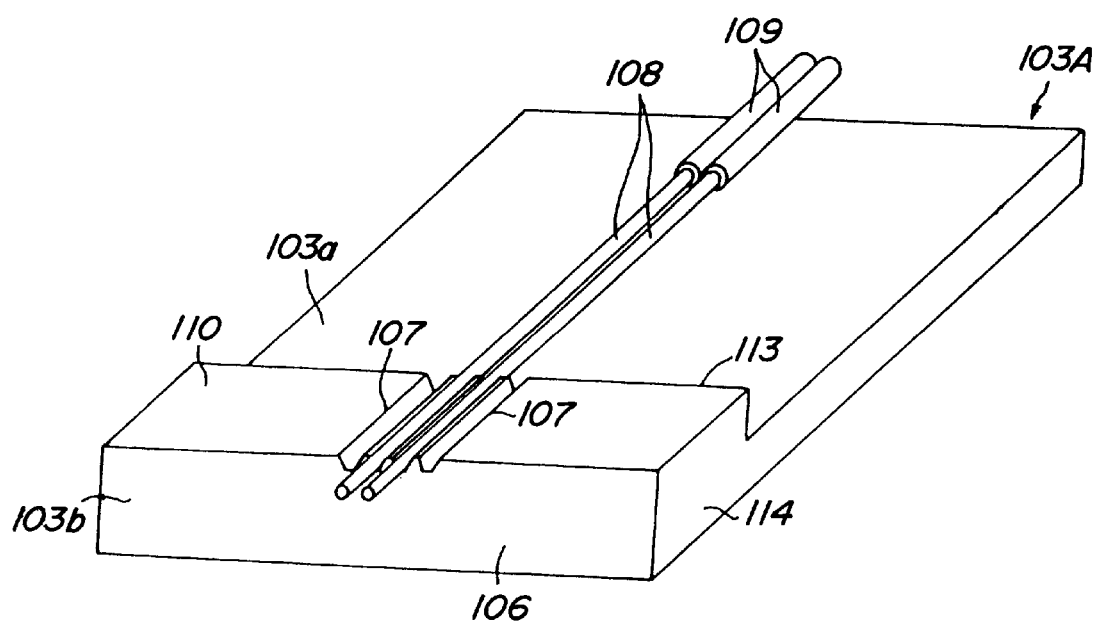
FIG_16

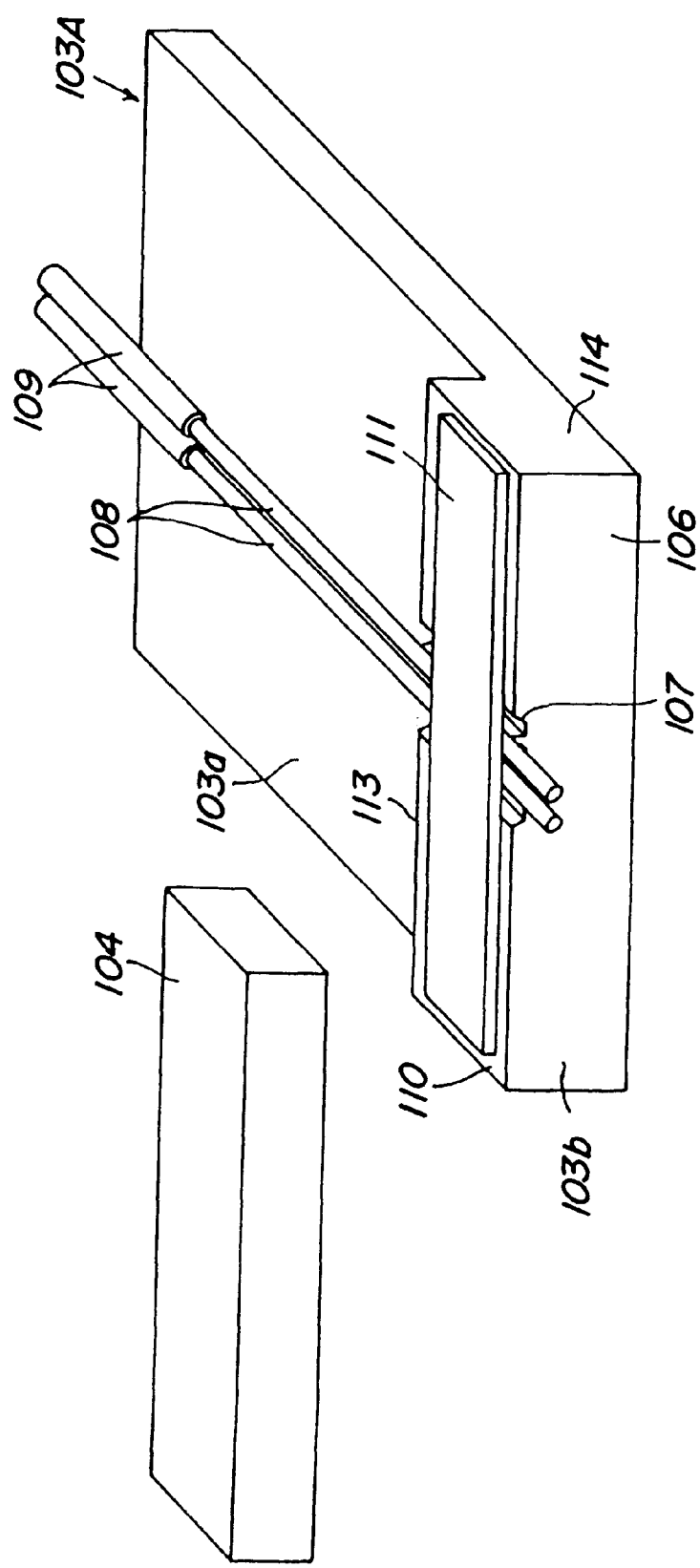
FIG_17

FIG_19

OPTICAL TRANSMITTING MEMBER-HOLDING STRUCTURE

BACKGROUND OF THE INVENTION

1. Field of the Invention

The present invention relates to a method for producing an optical transmitting member-holding structure in which one or more optical transmitting members such as optical fibers are held at a given location. The invention also relates to such an optical transmitting member-holding structure itself.

2. Related Art Statement

Various substrates for fixing plural optical fibers each having a diameter of for example, about 125 μm are known. Ordinarily, a holding substrate is provided with fixing grooves, such as V-shaped grooves, for fling the optical fibers at given locations. After plural optical fibers, for example, sixteen optical fibers are fixed to the holding substrate, this substrate itself is fixed to another optical part. At that time, each optical fiber is coupled to, for example, a light-emitting diode or a light-receiving element, or optically coupled to another optical fiber or rod lens.

As a material for the holding substrate, silicon, optical glass, ceramics, etc. are known. Further, the above fixing grooves are formed by etching for the holding substrate made of silicon or by grinding for the glass or ceramic substrate.

In any type of the substrate, if the optical axis of the optical fiber fixed to the substrate is deviated from its given location, a transmission loss increases between the optical fiber and the other optical transmitting means. Therefore, an extremely high working precision, for example, not more than 0.5 μm, is required as that in working the fixing groove on the optical fiber-holding substrate. The optical fibers are usually fixed in the V-shaped grooves with a resinous adhesive.

However, it is feared that if each optical fiber of such an optical transmitting member-holding structure is coupled to the light-emitting diode or the light-receiving element, an organic gas is generated from the resinous adhesive, is adhered to a light-emitting interface of the light-emitting diode, and deteriorates its light-emitting performance.

In order to avoid the occurrence of the above problem, the present inventors examined a technique for fixing each optical fiber into the corresponding V-shaped groove with solder. However, since the present optical fiber ordinarily has a diameter of about 125 μm and a gap between the surface of the V-shaped groove and the optical fiber is very small, it turned to be difficult to flow the solder into the V-groove from a terminal end face of the holding substrate and fill it in the V-shaped groove with no void. Therefore, a void in which no solder flows is likely to be formed between the surface of the V-shaped groove and the optical fiber.

The behavior of such a void in the solder within the groove is not clear. The optical fiber-holding structure as referred above is often placed in a principal position in such a state that the holding structure is received in a gas-tight casing or package. Into the receiving casing or package is often charged an inert gas such as nitrogen gas so as to prevent degradation of the optical element such as laser. However, if the package is sealed with such an optical fiber-holding structure itself it was made clear that if the groove is not fully filled with the solder as mentioned above, a void is retained and such a void propagates along the groove over a large distance, the inert gas may leak out along the propagated void inside the groove.

The package as mentioned above in which the optical fiber-holding structure is received is often placed under severe outside environment, so that it may be exposed to a high temperature of 60° C. to a low temperature of −40° C. or may be exposed to desert environment to highly humid environment. Therefore, the package in which the optical fiber-holding structure is placed must operate stably under the above severe surrounding environment for a long time. However, if a void is retained in the solder within the groove as mentioned above, air remaining in the void is repeatedly expanded and shrunk or moisture may enter the void. This sometimes makes the fixing location of the optical fiber slightly change. If the fixing location of the optical fiber changes, its optical axis deviates even in the case that such a change is slight. Consequently, the coupling loss increases or changes.

SUMMARY OF THE INVENTION

In a holding structure in which an optical transmitting member such as an optical fiber is fixed at a given location, it is an object of a first aspect of the present invention to assuredly fix an optical transmitting member into a fixing groove with use of solder while making it difficult for a gap to be formed between the optical transmitting member and the surface of the groove.

The first aspect of the present invention relates to a method for producing an optical transmitting member-holding structure in which an optical transmitting member is held and fixed at its given location on a holding substrate, said process comprising the steps of: (1) preparing the holding substrate provided with a groove for receiving and fixing the optical transmitting member onto the holding substrate, (2) placing the optical transmitting member within the groove, (3) placing a sheet of solder over the groove and the optical transmitting member, (4) heating the resulting assembly under application of pressure upon the solder sheet in a direction toward the groove, (5) flowing the solder into a gap between a surface of the groove and the optical transmitting member and charging the solder there; and (6) thereby fixing the optical transmitting member at the given location. In the above, "an optical transmitting member" means at least one optical transmitting member according to the first aspect of the present invention.

The present inventors contrived the technical idea that if the optical transmitting member is placed in the groove, then a sheet of solder is placed over and/or on the groove and the optical transmitting member, and the solder is flown into and changed into the gap between the surface of the groove and the optical transmitting member by heating the resulting assembly under application of pressure upon the solder sheet in a direction toward the groove. During the heating/pressurizing step, the solder sheet is crushed to flow preferentially into the groove and fill the gap between the optical transmitting member and the surface of the groove while the optical transmitting member itself is strongly pressed against the surface of the groove, and fixed at its given location. Thereby, the inventors succeeded in minimizing the deviation of the optical transmitting member from the given location and also in minimizing the gap between the surface of the groove and the optical transmitting member. By so doing, the inventors succeeded in putting into practical use the optical transmitting member-holding structure in which the optical transmitting member is fixed in the groove with the solder.

During the examination of the fixing the optical transmission member into the V-shaped groove of the holding substrate, the present inventors further noted the following problem from another point of view. As mentioned above, the optical fiber-holding structure is often placed in a principal position in such a state that the holding structure is received in a gas-tight casing or package. Into the receiving casing or package is often charged an inert gas such as nitrogen gas so as to prevent degradation of the optical element such as laser.

However, when the package is sealed with the optical fiber-holding structure itself and nitrogen is sealingly charged into the package, a very small amount of oxygen is contained in it. Therefore, the solder layer may be oxidized as viewed from a long-term standpoint. Once the solder layer begins to be oxidized, an oxidized portion grows so that an oxidized film is formed at an end face of the optical fiber-holding structure or an array. This oxidized film unfavorably makes transmission loss larger and the amount of light transmitted smaller.

Further, it cannot be basically said that solder is a strong metal, and solider is likely to be cracked by impact. If the solder layer is cracked, it may cause the holding substrate or a fixing plate to be floated, which deteriorates the arrayed degree of the optical fiber.

In the holding structure for fixing the optical transmitting member such as the optical fiber at a given location, it is an object of a second aspect of the present invention to prevent increase in transmission loss between the optical transmitting member and an external optical element and decrease in the amount of the light transmitted.

The second aspect of the present invention relates to an optical transmitting member-holding structure for holding an optical transmitting member at a given location, said holding structure comprising a holding substrate, at least one optical transmitting member placed on the holding substrate, a fixing substrate covering the optical transmitting member on the holding substrate, and a joining layer joining the holding substrate and the fixing substrate and fixing the optical transmitting member at said given location, said joining layer comprising an eutectic solder layer.

The second aspect of the present invention also relates to an optical transmitting member-holding structure for holding at least one optical transmitting member at a given location, said holding structure comprising a holding substrate, at least one optical transmitting member placed on the holding substrate, a fixing substrate covering the optical transmitting member on the holding substrate, and a joining layer joining the holding substrate and the fixing substrate and fixing the optical transmitting member at said given location, said holding substrate being provided with a fixing groove, said optical transmitting member being received in the fixing groove and fixed in the groove through the joining layer, and said joining layer comprising an eutectic solder layer. In the second aspect of the present invention, "an optical transmitting member" means "at least one optical transmitting member".

The present inventors examined the construction of the joining layer containing the eutectic solder in the optical transmitting member-holding structure, and succeeded in the production of the optical transmitting member-holding structure according to the second aspect of the present invention. The optical transmitting member-holding structure according to the second aspect of the present invention has strong oxidation resistance, so that even if the optical transmitting member-holding structure is employed to keep the atmosphere inside the package gas-tight, light transmission loss will not be increased between an external optical element over a long-term use. Since the joining layer contains the eutectic solder layer which has an eutectic mixture such as an Au/Ge solder as ingredients, these ingredients such as Au and Ge stably exist in the form of matrix. That is, this state is hardly reactive with oxygen, which makes the joining layer stronger against oxidation. Further, this is a stable and firm structure as mechanically viewed, which is strong against impact, etc. As the solder having the eutectic structure, gold-based solders are preferred. As to the gold-based solders, gold/tin solder, gold/germanium solder, and gold/silicon solder are preferred. Particularly, gold/tin solder is more preferred among them because the former easily flows.

These and other objects, features and advantages of the invention will be appreciated upon reading of the description of the invention when taken in conjunction with the attached drawings, with the understood that some modifications, variations and changes could be easily made by the skilled person in the art to which the invention pertains.

BRIEF DESCRIPTION OF THE DRAWINGS

For a better understanding of the invention, reference is made to the attached drawings, wherein:

FIG. 1(*a*) is a front view for outlining an optical fiber-holding structure or array as one embodiment according to the present invention, and FIG. 1(*b*) is a plane view for outlining this holding structure, and FIG. 1(*c*) is a side view of the structure as viewed from the left side;

FIG. 2 is a perspective view showing the state that a given number of grooves 7 are formed on a holding portion 3*b* of a holding substrate 3, and core wires 8 of optical fibers are received in the respective grooves 7;

FIG. 3 is a perspective view showing the state that a sheet 11 of solder is placed on an upper surface 10 of the holding portion 3*b* and the optical fibers 8;

FIG. 15(a) is a front view outlining an entire optical fiber-holding structure according to a preferred embodiment of the second aspect of the present invention, FIG. 15(b) is a plane view outlining this holding structure, and FIG. 15(c) is a side view of the holding structure in FIG. 15(b) from the left side;

FIG. 16 is a perspective view showing the state that core wires of optical fibers are placed in respective fixing grooves of a holding substrate;

FIG. 17 is a perspective view showing the state that a sheet 111 of solder is placed on the core wires of the optical fibers, and a fixing substrate 104 is being placed thereon;

DETAILED DESCRIPTION OF THE INVENTION

Figure 4:
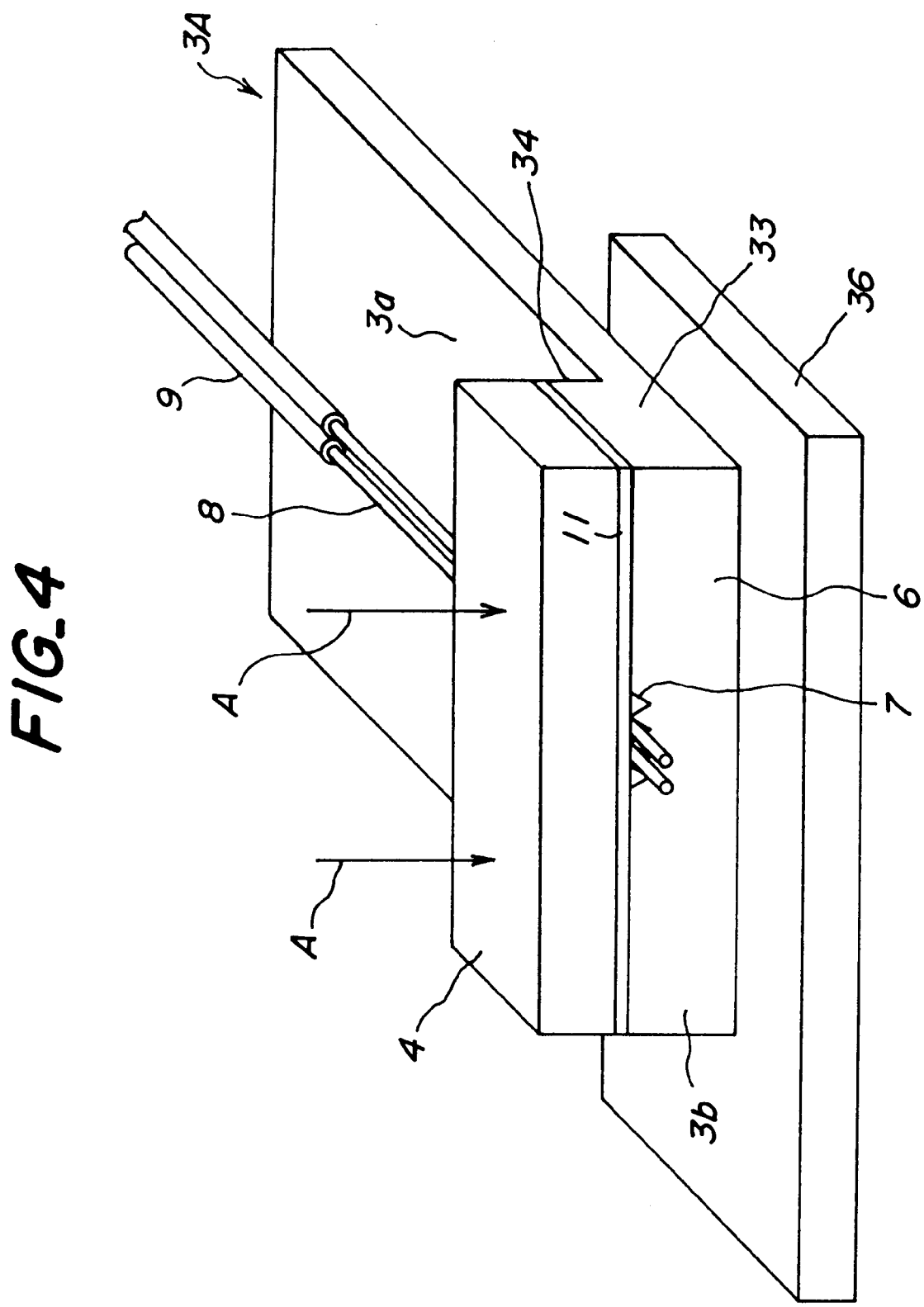
FIG. 4 is a perspective view showing the state that the solder sheet is being melted under application of pressure from an upper side of a lid 4.

In the following, preferred embodiments of the first aspect of the present invention will be explained with reference to the drawings. In the present invention, the optical transmitting member is preferably an optical fiber. However, the optical transmitting member may be a passive optical transmitting member such as a rod lens. The optical transmitting member may be optically coupled to another optical transmitting member or an optical element. The above is applicable to the second aspect of the present invention. Although the optical element is not limited to particular one, a light-emitting element for oscillating laser beam or a light-receiving element for receiving laser beam is preferred.

FIG. 1(a) is a front view for outlining an optical fiber-holding structure or array as one embodiment according to the present invention, and FIG. 1(b) is a plane view for outlining this holding structure, and FIG. 1(c) is a side view of the structure as viewed from the left side.

The optical fiber-holding structure 1 includes an optical fiber-holding substrate 3. This holding substrate 3 is provided with a covering-placing portion 3a for placing coverings of optical fibers on it. The coverings 2 of the optical fibers are fixed on the covering-placing portion 3a. A lid 5 is placed over the coverings 2 of the optical fibers. A holding portion 3b of the holding substrate 3 is formed with a given number of grooves 7, which all extend from an end face 6 of the holding portion 3b to the covering-placing portion 3a. A core wire 8 of the optical fiber is placed in each groove 7, and fixed there with solder according to the first aspect of the present invention. In this embodiment, each groove 7 has a V-shape.

The method for producing such an optical fiber array according to the present invention will be now explained. First, an optical fiber-holding substrate is produced. This holding substrate is made of silicon, a ceramic material or glass, and provided with grooves 7. Each groove 7 is very small, for example, 125 µm deep. Core wires 8 of optical fibers are placed and arrayed in the respective grooves 7.

The grooves may be formed on the optical fiber-holding substrate by etching if it is made of silicon. However, this method has a limit in working precision, so that it was difficult to form V-grooves at a high precision beyond a certain level in some case. If the holding substrate is made of a ceramic material such as alumina, agate or zirconia or glass, the grooves may be formed by grinding. In this case, for example, a sintered body is produced by sintering a ceramic molded body, a flat plane is formed at the sintered body by plane grinding, and the grooves are formed by grinding the flat plane with a diamond grinding stone. Alternatively, the fixing grooves may be formed on the optical fiber-holding substrate by press molding.

As the glass, BK-7 optical glass, borosilicate glass, soda-lime glass, ion-exchange glass, and $LiO_2$—$Al_2O_3$—$SiO_2$ based glass are particularly preferred.

In order to produce an optical fiber-holding structure as shown in FIG. 1, as shown in FIG. 2, a given number of grooves 7 are formed on a holding portion 3b of a holding substrate 3A, and core wires 8 of optical fibers are placed in the respective grooves 7. A reference numeral 10 denotes an upper face of the holding portion 3b, and reference numerals 33 and 34 denote a side face and the other end face of the holding portion 3b, respectively.

An open angle of each groove is not particularly limited. However, in order to form each groove by grinding, the cross-sectional shape of the groove is determined by the shape of a grinding stone (usually a diamond grinding stone) used. The shape of the grinding stone changes little by little during grinding, So that its tip becomes round. At that time, what is a most important portion of the shape of the groove is that of inclined faces of the groove which the optical fiber directly contacts. Each inclined face must be a flat plane extending straight over the entire length of the groove. From this point of view, it is preferable that the grinding stone is sharpened to make the open angle of the groove small, preferably specifically not more than 90° C. On the other hand, if the open degree of the groove is too small, the optical fiber is not easy to enter the groove, and solder is extremely difficult to enter the bottom portion of the groove. Therefore, the open degree of the groove is preferably not more than 60° C.

The distance or pitch between the adjacent grooves is not particularly limited. The number of the optical fibers to be fixed to one optical fiber-holding substrate is determined by the number of optical elements to be optically coupled to the optical fibers, respectively. The optical fiber-holding structure produced according to the first aspect of the present invention is particularly favorably used or a parallel transmitting module. In this case, since eight channels corresponding to eight-bit signals and channels corresponding to other control signals such as clock signals are ordinarily necessary, it is considered that a general tape fiber (12 rows of optical fibers or like) is used. In this case, since the pitch of the fibers of the tape fiber is 250 µm, the pitch between the adjacent grooves is preferably 250 µm.

Then, as shown in FIG. 3, the grooves 7 and the core wires 8 of the optical fibers placed therein are covered with a sheet of solder, 11 by placing it on the upper face 10 of the holding portion 3b. As shown in FIG. 3, a lid 4 is placed on the solder sheet 11. Then, as shown in FIG. 4, the holding substrate 3A is placed on a given heating source (for example, a hot plate 36), so that at least a portion of the solder sheet 11 is heated. During the heating, given pressure is applied onto the lid 4 in a direction of an arrow A from the upper side.

Figure 5:
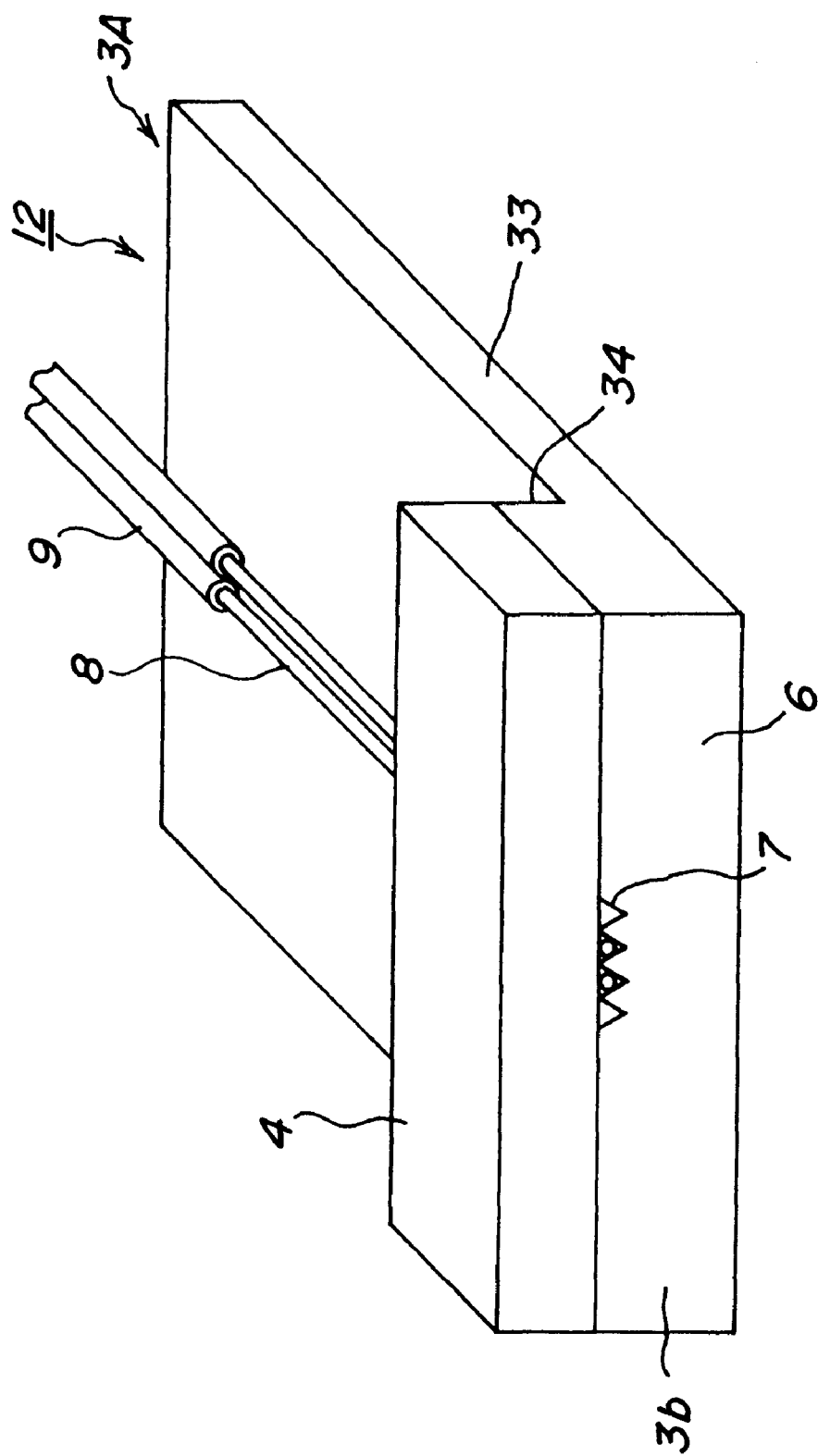
FIG. 5 is a perspective view showing an optical fiber-holding structure obtained by the first aspect of the present invention.

After the above heat treatment, the entire holding structure is removed from the hot plate, thereby obtaining the holding structure shown in FIG. 5. An end face of the core wire 8 of each optical fiber is optically polished, and is exposed to the end face 6 of the holding portion 3b of the holding substrate 3A.

Since the distance between the surface of each optical fiber and that of the groove inside the groove is extremely small, it is necessary to use solder which can particularly easily wet the surface of the groove. In order to improve wettability of the solder on the surface of the groove, it is usually preferably to add a flux into the solder. However, as to the optical fiber-holding substrate to which the invention pertains, it is preferable that precision in the fixing location of the optical fiber inside the groove is high, and that the solder is completely made of an inorganic material. For this reason, it is particularly preferable that a gold-based eutectic solder having excellent wettability is used.

As such the eutectic solder, gold/tin solder, gold/germanium solder, and gold/silicon solder are preferred. Particularly, the gold/tin solder is preferred because of its easy flowing.

If the holding substrate is made of glass or a ceramic material, the solder does not directly wet the surface of the groove. For this reason, it is necessary to form a metallizing layer on at least the surface of the groove. The metallizing layer is not limited to any particular material However, it is preferable that the metallizing layer is formed by plural metallic layers such that a lower side layer of the metallizing layer is made of a metal having excellent adhesion to the holding substrate. Further, a front side of the metallizing layer is preferably made of the same kind of the material as that of the solder used, and that particularly gold or a gold alloy is preferred.

In a particularly preferable embodiment, the metallizing layer is composed of (1) a chromium layer/a gold layer or (2) a titanium layer/a platinum layer/a gold layer side. In the case (1), the chromium layer and the gold layer are successively placed on the surface of the holding surface in this order, the gold layer being located at an outer side. In the case (2), the titanium layer, the platinum layer and the gold layer are successively placed on the surface of the holding surface in this order, the gold layer being located at an outer side. The entire thickness of the metallizing layer is preferable not more than 1.5 µm in that the positional precision in the optical axis of the optical fiber in the groove should be enhanced. On the other hand, the entire thickness of the metallizing layer is preferably not less than 0.5 µm in that the wettability should be improved. For example, a 0.1 µm-thick titanium layer, a 0.1 µm-thick platinum layer and a 1 µm-thick gold layer are successively laminated together.

In the optical fiber array, the lid 4 is preferably usually used to cover the holding portion 3b from the upper side. In this case, since pressure can be applied to the solder sheet by pressing the lid 4 as shown by an arrow A, pressure can be uniformly applied to the entire surface of the solder sheet. However, it is preferable that a metallizing layer is formed on the bottom surface 4a of the lid 4 which the solder sheet contacts. This can prevent occurrence of a very small void between the lid 4 and the optical fiber which void would contain no solder.

Next, a metallizing layer is preferably also formed on the surface of the optical transmitting member such as the optical fiber. For example, since a communication optical fiber is ordinarily made of quartz, the fiber is difficult to be directly wetted with solder. When the solder is shrunk during cooling, the solder surrounding the outer peripheral surface of the optical fiber radially inwardly pressurizes the optical fiber to firmly grasp it. If this pressurizing pressure is too large, slight anisotropy occurs in the material of the optical fiber owing to the pressure exerted upon it from the solder, which may influence optical signals transmitted through the optical fiber. However, if the metallizing layer is formed on the surface of the optical fiber, the pressurizing effect owing to the shrinkage of the solder is difficult to be afforded upon the optical fiber.

Then, the solder needs be melted by heating ordinarily at about 250° C. to about 400° C. If the core wires of the optical fibers are held on the holding substrate while the coverings of the optical fibers are not held on the holding substrate, no substantial problem occurs when the entire holding substrate is placed in a furnace and heated there at 250° C. to 400° C.

However, if the core wires and the coverings of the optical fibers are held on the holding substrate (for example, in a case of a pig-tail type optical fiber array), any countermeasure must be so taken that the coverings may not be melted. In this case, it is preferable that the temperature around the coverings of the optical fibers is not increased by locally heating only the holding portion upon which the core wires of the optical fibers are held. In order to do this, for example, the holding substrate is placed on the hot plate, and the surrounding portion of the holding portion only is heated.

Further, if the solder is oxidized during heating, the solder is difficult to wet the metallizing layer and the optical fiber. Therefore, it is preferable that at least the solder sheet is held in an inert atmosphere during heating. However, as mentioned above, if the holding substrate is placed on the hot plate to locally heat only the holding portion for the core wires of the optical fibers, it is difficult to keep the entire surrounding of the holding substrate in the inert atmosphere. For this reason, an inert gas, preferably nitrogen gas, is desirably continuously blown, at least during heating the solder sheet, upon the entire zone of the portion of the holding substrate to be locally heated.

The solder sheet-heating temperature is particularly preferably set at not less than (the eutectic point of the solder +20° C.) and not more than (the eutectic point of the solder +50° C.). By setting the heating temperature of the solder sheet at not less than (the eutectic point of the solder +20° C.), the solder can be surely penetrated into the surrounding of the optical fiber. On the other hand, if the heating temperature of the solder sheet is set at not more than (the eutectic point of the solder +50° C.), the disappearance of the metallizing layer on the surface of the holding substrate and/or the lid can be prevented. For example, if the solder is gold/germanium solder (eutectic point: 356° C.), the working temperature is most appropriately around 390° C.

According to the first aspect of the present invention, it is indispensable to apply a load upon the solder sheet toward the optical transmitting member(s) during heating. When no load was applied, there was possibility that when the solder sheet was melted, the location of each optical transmitting member was not fixed, and each optical transmitting member could not be fixed at a given location because the optical fiber moved in the molten solder.

In order to press the fiber against the V-shaped groove, the load is preferably set not less than 500 g/cm$^2$. In order to prevent adverse effect of the load upon the optical transmitting member, the load is preferably not more than 2500 g/cm$^2$.

When the solder sheet is heated while a load is being applied onto the solder sheet, a part of the melted solder flows toward the peripheral edge of the upper face 10 of the holding portion 3b in FIG. 3, while wetting the upper face 10. At that time, in order to ensure the flowing of the solder on thee upper face 10, it is preferable that the dimension of the solder sheet 11 is made smaller than that of the upper face 10, and that the metallizing layer is provided on the entire upper face 10.

Figure 6:
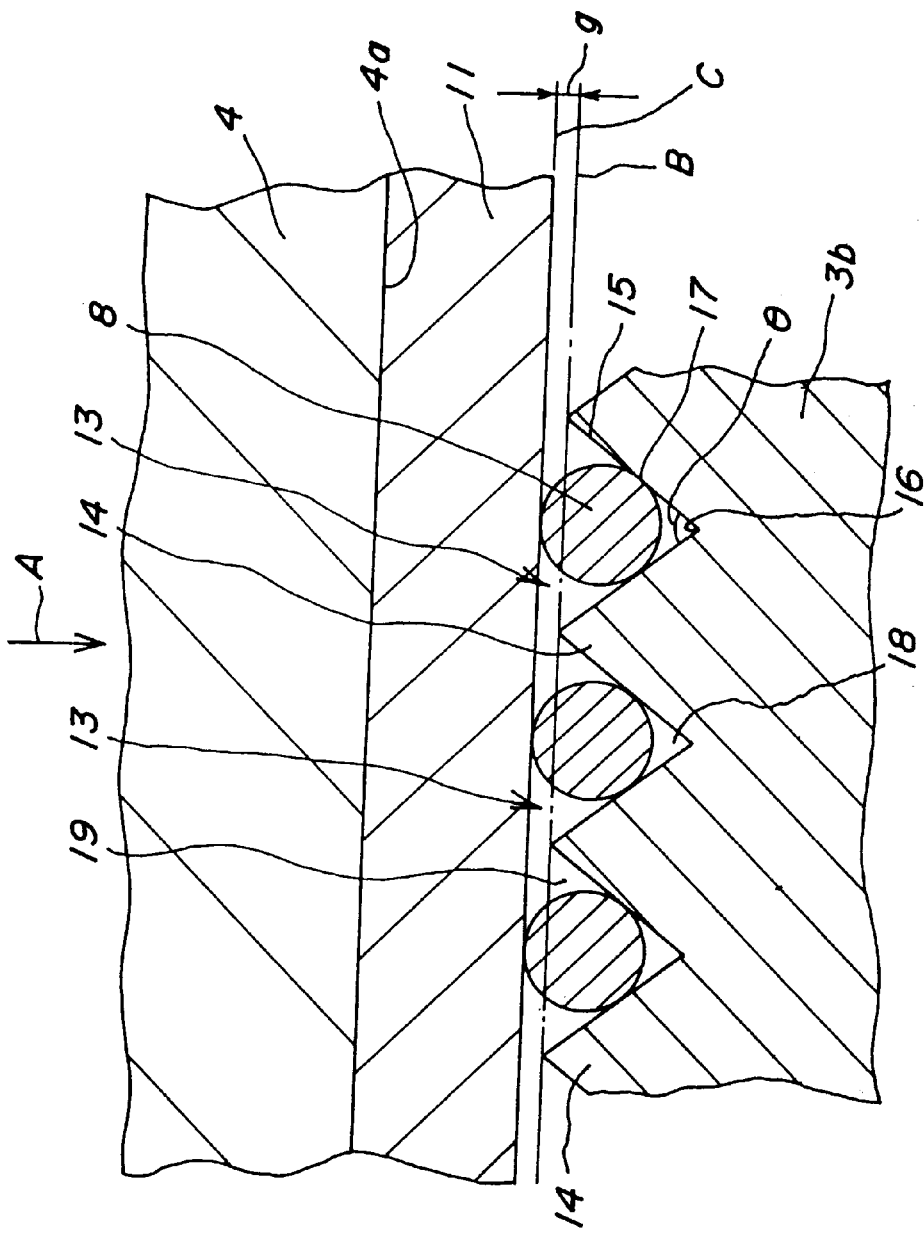
FIG. 6 is a sectional view of an embodiment of the first aspect of the present invention in which profile details of grooves are shown.
Figure 7:
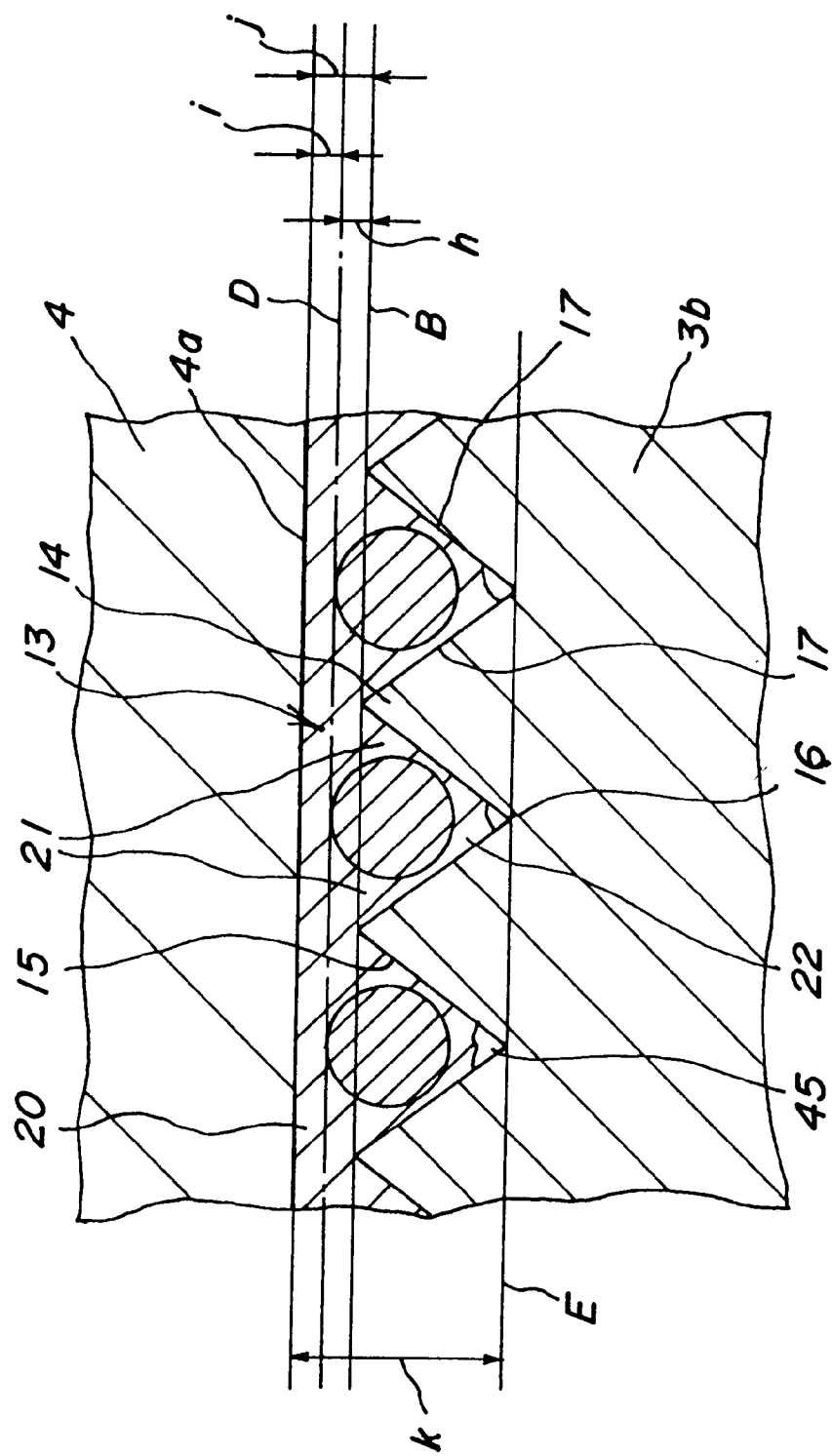
FIG. 7 is a sectional view of FIG. 6, provided that the optical fibers are fixed in the grooves with solder 20.

Next, details of preferred embodiments of the optical transmitting member-holding structure which can be made by the method of the first aspect of the present invention will be further explained. FIG. 6 is a sectional view of a principal portion in which optical fibers 8 are received in so-called V-shaped grooves 13 and a sheet 11 of solder is placed on the optical fibers 8. FIG. 7 is a sectional view of a principal portion in which each optical fiber is fixed in the V-shaped groove with the solder through melting the solder.

Each V-shaped groove 13 is formed between projections 14 each having an almost triangular sectional shape with acute angles. Although an angle of the bottom portion 16 of each V-shaped groove is rather acute, the bottom portion 16 has a slight round section because the tip of the grinding stone is actually round. As mentioned above, each optical fiber 8 is placed in a corresponding V-shaped groove 13. At that time, the outer peripheral surface of each optical fiber 8 contacts an inclined surface 15 of each projection 14. A reference numeral 17 denotes a contact between the optical fiber 8 and the inclined surface 15 of the projection 14.

A flat plane C is a flat plane formed by connecting tops of the optical fibers 8 in the state that the optical fibers 8 are placed in the respective V-shaped grooves 13. B denotes a flat plate formed by connecting top peaks of the projections 14. It is preferable that when the solder sheet 11 is placed on the holding portion 3b of the holding substrate, the top of each optical fiber 8 contacts the solder sheet 11. That is, the flat plane C is preferably located above the flat plane B.

The height "g" of a portion of each optical fiber that projects upwardly from the projections is preferably—1 $\mu$m to 5 $\mu$m, and particularly preferably 1 $\mu$m to 5 $\mu$m. If no portion of each optical fiber 8 projects upwardly from the projections in the state that the optical fiber is entirely received in the V-shaped groove, precision in the location of the optical fiber 8 is likely to be decreased, because when the solder sheet is to be crushed, the optical fiber 8 may move in the V-shaped groove irrespective of crushing pressure. On the other hand, the height of each projection constituting each V-shaped groove is determined by the distances or pitch between the adjacent optical fibers and the open angle θ of the V-shaped groove, while the diameter of each optical fiber 8 is preliminarily determined. Therefore, it is difficult to make the height "g" greater than 80 $\mu$m.

After the solder sheet is heated under pressure, as shown in FIG. 7, the bottom surface 4a of the lid 4 approaches the projections 14, so that the thickness of the solder sheet decreases and each optical fiber 8 is held at an almost given location of the V-shaped groove 13. At that time, according to the first aspect of the present invention, since the pressure is downwardly applied through the lid 4, the optical fibers 8 can be prevented from being floated and upwardly rising in the melted solder.

Figure 10:
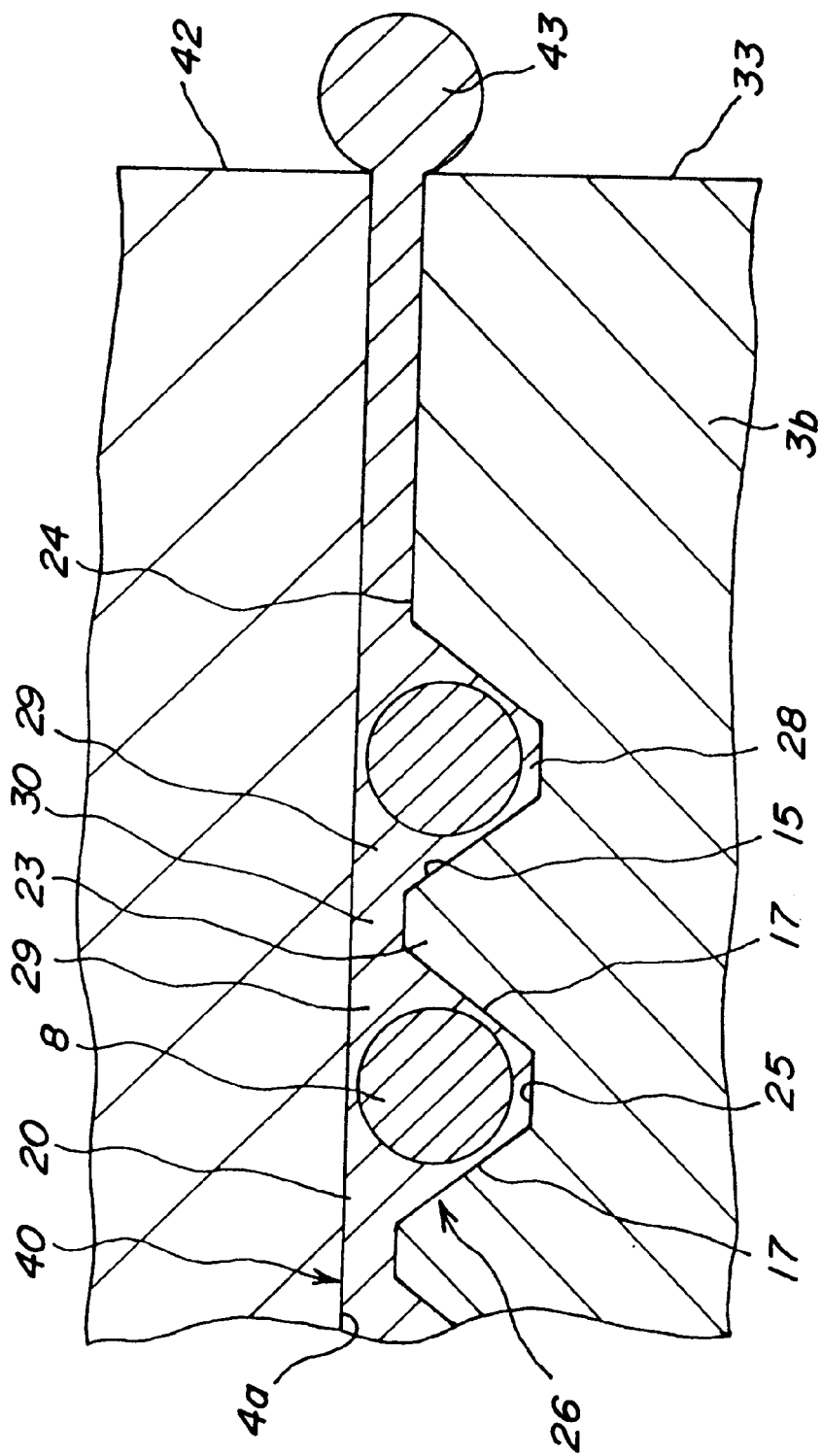
FIG. 10 is a sectional view for illustrating the flowing of an excess solder 43 as in the structure in FIG. 9.

During the heating and the pressurizing, a part of the solder constituting the solder sheet flows toward spaces 19 among the optical fibers 8 and the projections 14, and fill there, while a part of the remainder flows along the upper face in FIG. 10 of the holding portion 3b toward the peripheral edges of the upper surface 10 of the holding portion. Further, other part of the solder further enters spaces 18 under the optical fibers 8.

At that time, in FIG. 3, no metallizing layer is provided at the side face 33 or the end faces 6, 34 of the holding portion 3b, no excess solder flows onto these faces. Since no solder-escaping plate exists like this, the thickness of the solder does not decrease beyond a given level even if pressure is applied to the solder sheet (This reason will be explained later). For this reason, in FIG. 7, a distance j between the flat plane B connecting the top peaks of the projections 14 and the bottom surface 4a of the lid 4 does not decrease beyond a given value. If a solder sheet having a thickness of 50 $\mu$m is used, the distance j is 8–30 $\mu$m.

In order to crush the solder sheet to the j being not more than 1 $\mu$m, a metallizing layer is formed on at least that portion of each of the side face 33 and the end faces 6, 34 which contacts the upper surface 10 of the holding portion 3b so that the volume of the solder remaining around the grooves and the optical fibers can be decreased. As a result, the volume of the solder existing around each optical fiber can be decreased, so that the precision in the location of the optical fiber can be further enhanced.

In FIG. 7, the solder sheet is ordinarily so crushed that "i" may be about 5–20 $\mu$m, while "h" being 3–10 $\mu$m at the maximum. D denotes a flat plane connecting the tops of the optical fibers 8, whereas E is a flat plane connecting the bottoms 16 of the V-shaped grooves 13. Among dimensions in FIG. 7, "k" and "j" are limited by the thickness and the area of the solder sheet and the excess amount of the solder existing at the side faces, so that "k" or "j" cannot be decreased beyond a given value. In FIG. 7, a reference numeral 21 denotes the solder existing between the optical fiber and the projection.

With respect to the structure shown in FIG. 7 using the V-shaped grooves 13, the present inventors discovered that the following problem existed. That is, the solder is difficult to flow near the contact 17 between the optical fiber 8 and the projection 14 in FIG. 6, particularly in an initial stage of the melting of the solder. In addition, as mentioned above, since the open degree θ of the bottom 16 of each groove 13 is preferably 60°–90°, and very sharp, the bottom portion 16 is difficult to be wet with the solder. As a result, the solder is difficult to enter a tip portion of the solder layer 22 between the optical fiber 8 and the bottom portion 16, so that a void defect 45 may be formed. Such a void defect may cause leakage of an inert gas.

At a point of time when the melting of the solder is finished, the optical fiber 8 is floated in the solder 20. At that time, the final stopped location of each of the optical fibers 8 may deviate from its intended one. In order to lessen this erroneous deviation, it is necessary that the dimension "i" is decreased, that is, the solder is crushed as thin as possible. However, it is difficult to do so, because the amount of the solder which can exist at the side faces of the holding portion 3b is limited.

Figure 8:
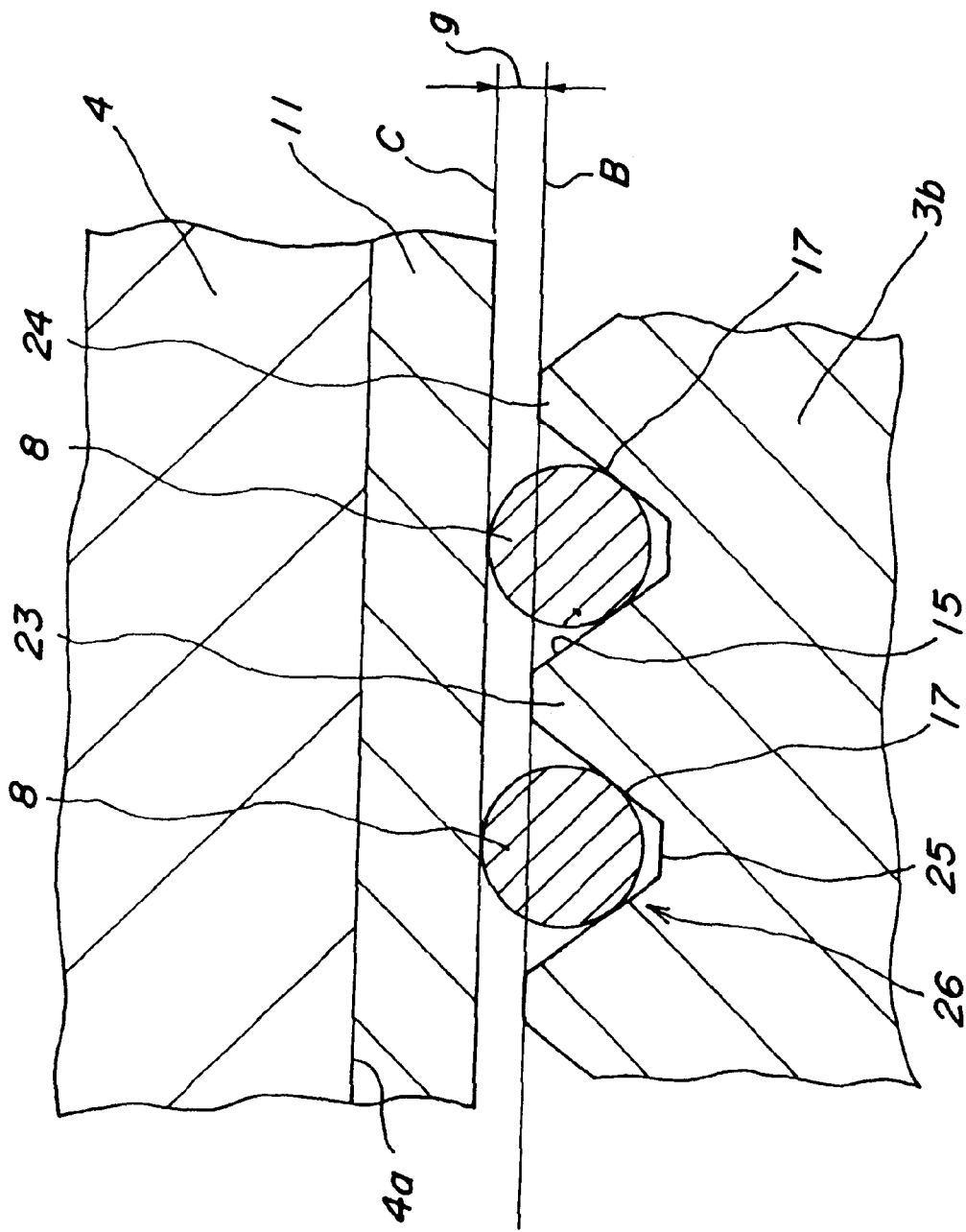
FIG. 8 is a sectional view of another embodiment of the first aspect of the present invention in which profile details of grooves are shown.
Figure 9:
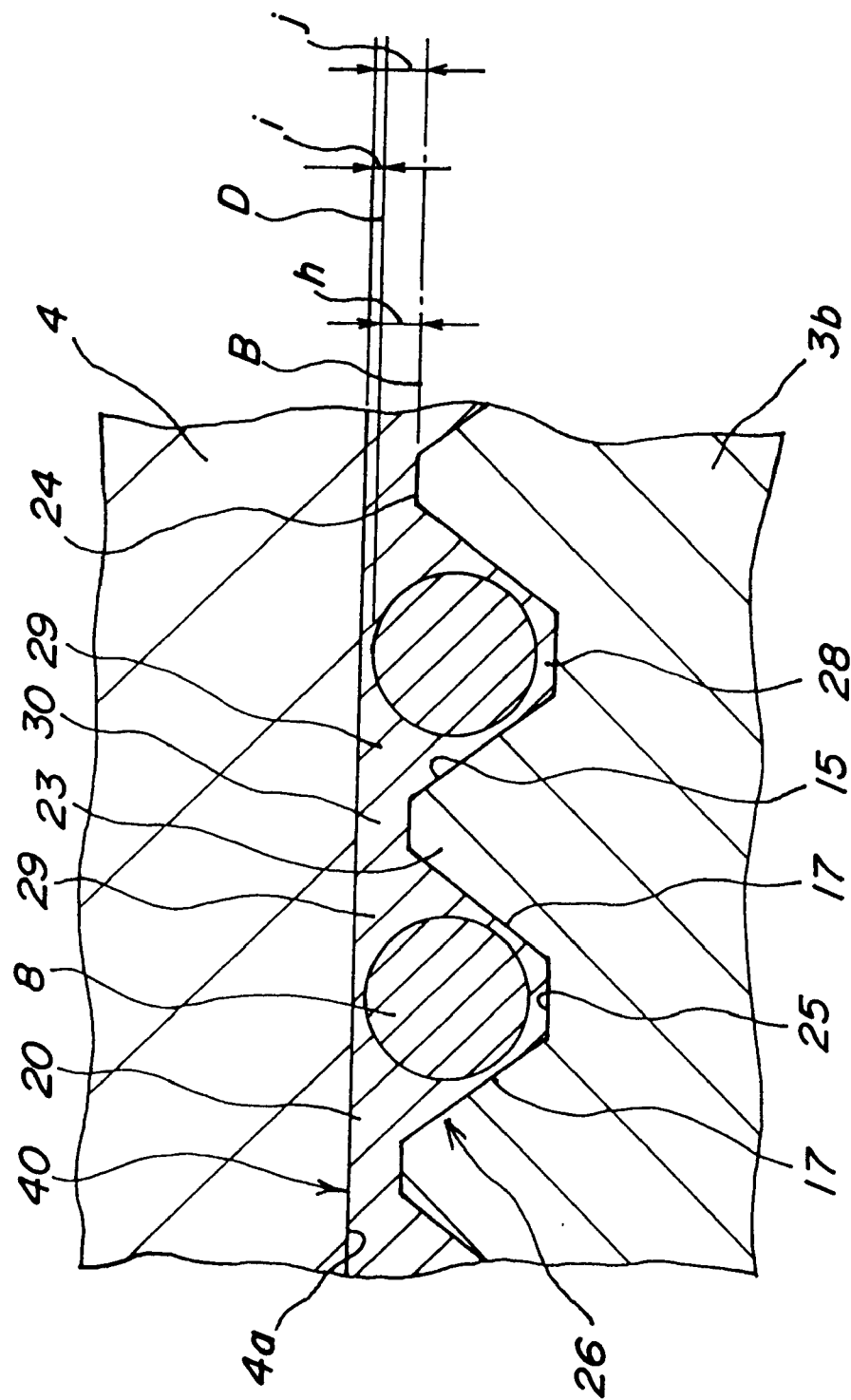
FIG. 9 is a sectional view of FIG. 8, provided that the optical fibers are fixed in the grooves with solder 20.

Having examined this problem, the present inventors realized the following embodiment. This embodiment will be explained. FIG. 8 is a sectional view for illustrating the state that each optical fiber is placed in a corresponding groove, but not fixed to it with solder. FIG. 9 is a sectional view for illustrating the state that each optical fiber is fixed into the groove with the corresponding solder.

Each groove has an almost trapezoidal cross-sectional view, and has inclined flat surfaces 15. In each groove 26, a flat plane portion 25 is formed between a pair of the opposed inclined surfaces 15 of the adjacent projections 23. A flat plane portion 24 is formed at a top of each projection. Such a flat plane portion 24 may be formed by polishing the top portion of each projection 14 as shown in FIG. 7. Alternatively, the flat plane portions 24 may be formed by press molding. It is preferable that when the solder sheet 11 is placed on the holding portion 3b, the tops of the optical fibers contact the solder sheet 11. At this stage, the distance "g" between the flat plane B connecting the flat plane portions 24 of the projections and the flat plane C connecting the tops of the optical fibers is preferably not less than 10 µm, and more preferably 20 µm–30 µm.

A fine structure shown in FIG. 9 is obtained by treating the assembly of FIG. 8 according to the first aspect of the present invention. Reference numerals given in FIG. 9 denote the same or similar parts as shown in FIG. 7, respectively. The solder is melted, flows onto the projections 23, and along the inclined surfaces 15, and enters spaces defined between the undersides of the optical fibers 8 and the flat portions 25.

As a result, as shown in FIG. 9, each optical fiber 8 is placed in the corresponding groove 26, while a part of the optical fiber 8 projects upwardly from the flat plane portions 24. In this embodiment, the solder flows into areas 29 sidewise of the optical fibers as well as into spaces 30 above the flat plane portions 24 of the projections 23. As a result, the distance "j" between the bottom surface 4a of the lid 4 and the flat plane B connecting the tops of the projections is equal to the value as mentioned above. In addition, the height "h" of the projected portion of the optical fiber from the flat plane B could be set at 8 µm–30 µm.

When the melting of the solder is finished, there is a tendency that the optical fibers 8 are floated in the solder 20, and each optical fiber is fixed at an almost equal distance with respect to the bottom surface 4a of the lid 4 and a pair of the respective inclined surfaces 15. According to the present embodiment, the flat plane portion 24 is formed by removing the tip of the projection 23, and the solder enters the space 30 above the flat plane portion 24. Therefore, as compared with the embodiments as shown in FIGS. 6 and 7, the solder sheet can be more thinly crushed to a location nearer to the optical fibers. By so doing, the distance "i" between the bottom surface 4a of the lid 4 and the optical fibers can be reduced to a very small value, for example, not more than 1 µm, so that deviation in the fixing location of each optical fiber can be made extremely small.

The above will be explained in more detail. In FIG. 10, the embodiment is more extensively shown, including side faces 33 and 34 in addition to FIG. 9. Since no metallizing layer is formed on the side faces 33, 42, none of them are wetted with the solder. Although the solder flows into the areas 29 sidewise of the optical fibers and the spaces 30 above the flat plane portions 24 of the projections 23, an excess portion of the solder which has no room to go flows between the holding portion 3b of the holding substrate and the lid 4, and then oozes out from between the side faces 33, 42.

At that time, since none of the side faces 33, 42 are metallized, the solder swells from the solder layer at a given surface tension without wetting the side faces. A reference numeral 43 denotes this excess solder. However, since the surface of this excess solder is oxidized to raise its surface tension, the excess solder cannot exist in an amount more than a given value. Since the excess solder cannot be prevented from being oxidized to some extent even if the atmosphere is a nitrogen atmosphere. That is, the oxidization of the excess solder 43 cannot be completely avoided. The excess solder portion which can exist like this is a portion of the solder which is deformable (changeable in volume) through melting and solidification of the solder.

There is a lower limit for thickness of the solder sheet 11, and it is difficult to set this thickness at not more than 40 µm even by the present working technique. Since the solder sheet 11 has a lower limit thickness, it is difficult to set the distance between the surface of holding substrate and the surface 4a of the lid 4 at not more than a given value. For example, in FIG. 7, the distance "j" between the flat plane B connecting the projections 14 and the bottom surface 4a of the lid 4 cannot be decreased beyond a given value, and this distance "j" is ordinarily 8–30 µm. As a result, since the optical fiber is floated in the solder toward the bottom surface 4a of the lid 4 during when the solder is being melted, the precision in the fixing location of the optical fiber tends to decrease.

To the contrary, since the optical fibers 8 project from the grooves 26 by the height "h" in the structure shown in FIG. 9, the distance "i" between the bottom surface 4a of the lid 4 and the optical fibers 8 decreases even if the distance "j" is equivalent to that in FIG. 7, for example, 8–30 µm. As a result, as compared with the structure shown in FIG. 7, the precision in the fixing location of the optical fiber 8 is remarkably enhanced.

In addition, it became more easier for the solder to wet the bottom of the groove 26 when the flat plane portion 25 was provided at the bottom face side of the groove 26. Consequently, a void 45 as shown in FIG. 7 hardly occurred. By so doing, a thin solder layer having an almost uniform thickness was formed between the optical fiber 8 and the projection 23. In order to have up to the bottom portion of the groove fully wetted with the solder, the width of the flat plane portion 25 at the bottom of the groove is preferably set at not less than 10 µm. Further, although no particular limitation is posed upon the maximum width of the flat plane portion 25, it is ordinarily not more than 60 µm. In addition, although no particular limitation is posed upon the depth of the groove, that depth is so set that the surface of the optical fiber may not directly contact the flat plane portion 25 in the state that the optical fiber is set in the groove as shown in FIG. 8. At that time, the optical fiber is preferably held on the inclined surfaces 15 of the groove at two points 17.

In the fine structure shown in FIG. 9, a thin solder layer having an almost uniform thickness is formed in a space 28 among the adjacent optical fibers 8 and the projection 23, whereas a collected mass solder 40 is formed between the adjacent optical fibers 8. The collected solder 40 is constituted by the solder filling the spaces 29 and 30.

The solder fills the entire space between the upper face 10 of the holding portion 3b of the holding substrate and the bottom surface 4a of the lid 4, the resulting optical transmitting member-holding structure has high mechanical strength and excellent positional stability of the optical fibers against changes in temperature. In other words, this can be said that optical transmission performance is excellent in coupling between the optical transmitting member-holding structure and an optical element.

Further, each optical fiber is assuredly pressed against the wall surfaces of the groove, so that the optical fiber-arrayed precision is ensured. Therefore, the optical transmitting member-holding structure can exhibit sufficient performance even in uses where high arrayed precision is sought as in a case of single-mode optical fibers.

Furthermore, in the structure shown in FIG. 9, the optical fibers are projected upwardly from the flat plane B, the projects 23 are not sharpened, and the large space into which the molten solder flows is ensured. Therefore, since the solder can easily flow, without being interrupted during a time period from starting the melting of the solder to charging the melt into the space between the flat plane B and the bottom surface 4a of the lid, a time period required between the melting of the solder and the termination of charging it can be shortened.

According to the first aspect of the present invention, it is preferable to charge the solder over the entire upper face 10 of the holding substrate shown in FIG. 3 when the joining between the lid and the substrate with the solder is finished. By so doing, gas tightness can be maintained between the upper surface 10 of the substrate and the bottom surface 4a of the lid. Thus, this is particularly preferable for an optical device designed such that the gas-tightness of the package is maintained by the above optical fiber array.

As mentioned above, according to the first aspect of the present invention, each of the optical transmitting member can be assuredly fixed in the groove with use of the solder in the holding structure in which at least one optical transmitting member such as the optical fiber is fixed at a given location, so that a space is hardly formed between the optical transmitting member and the groove.

Next, the optical transmitting member-holding structure according to the second aspect of the present invention will be explained with reference to the attached drawings together with its function and effects.

The present inventors produced and examined an optical transmitting member-holding structure as shown in 11. The holding structure thus produced and examined was almost the same as given in FIGS. 6 and 7, provided that no pressure was applied during heating the solder, the lid 4 and the solder layer are referred to as "fixing substrate" and "joining layer", respectively, in the second aspect of the present invention.

Figure 11:
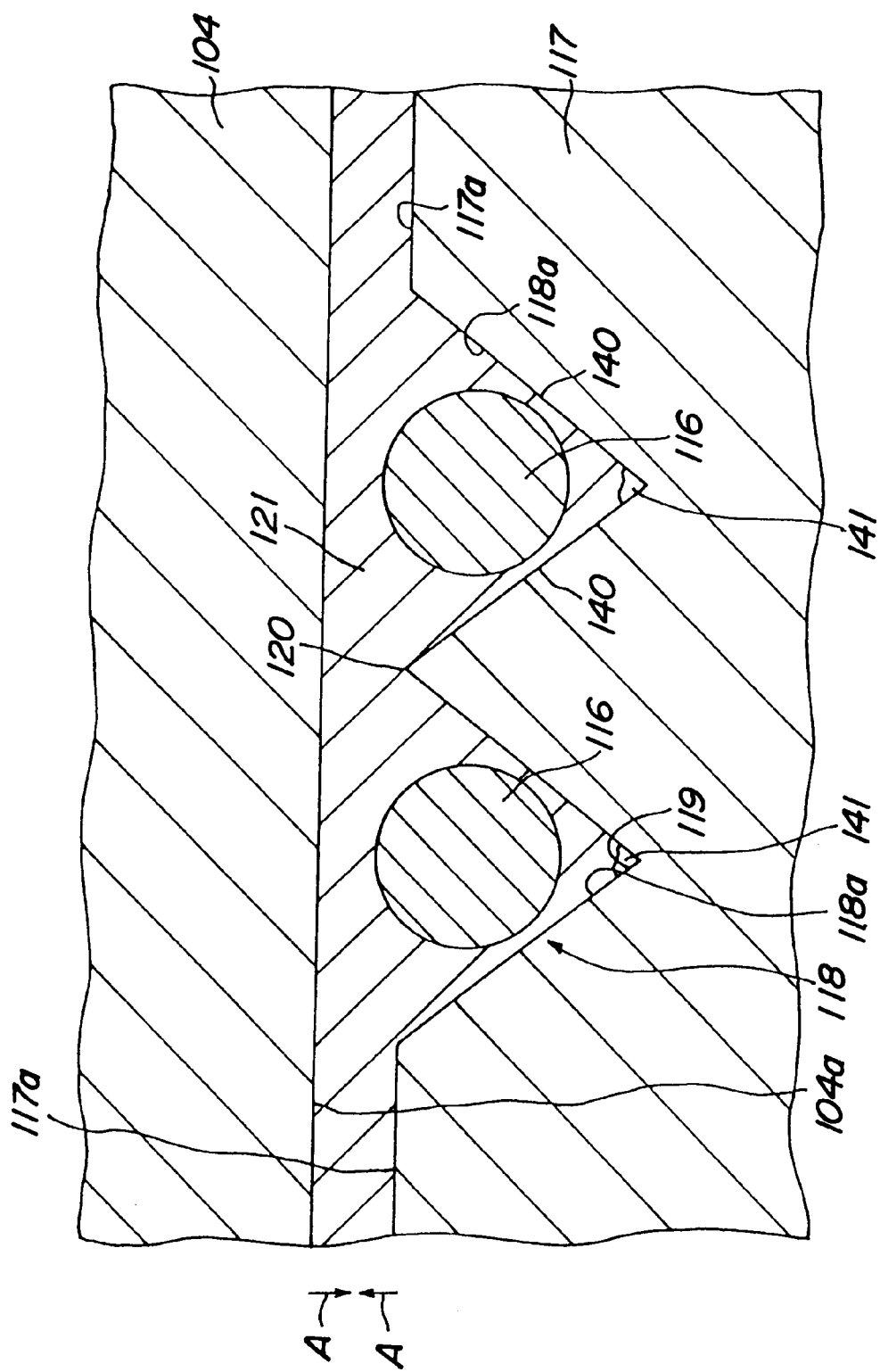
FIG. 11 is a sectional view showing a principal portion of an embodiment of the optical transmitting fiber-holding structure according to the second aspect of the present invention.

In the optical fiber-holding structure of FIG. 11, reference numerals 104, 116, 117, 118 and 121 denote a fixing substrate, an optical fiber, a holding substrate and a joining layer, respectively, which were assembled in the same manner as illustrated in FIGS. 6 and 7 provided that the joining was effected by heating under application of no pressure.

Having examined the optical fiber-holding structure as shown in FIGS. 6 and 7, the inventors further discovered the following problem. That is, fine continuous gaps might be formed near at an interface between the joining layer 111 and the holding substrate 117 and near at an interface between the joining layer 112 and the fixing substrate 104.

It is unclear how such gaps behave. However, the optical transmitting member-holding structure aimed at by the present invention, such as the optical fiber-holding structure, is often provided in a principal portion of an optical cable in such a state that the holding structure is accommodated in a gas-tight casing or package. This accommodating package is often filled with an inert gas such as nitrogen gas to prevent degradation of an optical element such as laser. However, if the package is sealed with this optical fiber-holding structure, there is possibility that the inert gas may leak outside through the gap along the surface 104a of the holding substrate 104 or through the gap along the bottom surface 4a of the fixing substrate 104.

Further, the package in which the optical fiber-holding structure is accommodated is often placed in an outside severe environment, and exposed to high temperatures such as 60° C. to low temperatures such as −40° C. or exposed to a desert environment or a highly humid environment. The package for the optical fiber-holding structure must operate stably for a long time period under such a severe surrounding environment. However, there was possibility that if the gap remains in the solder as mentioned above, the air remaining in the gap might repeatedly expanded and shrunk, moisture might invade the gap, or the fixed location of the optical fiber might be slightly changed thereby. If the fixed location of the optical fiber changes, the optical axis thereof deviates from its intended location even if such a change is slight. Consequently, it is feared that the connection loss may increase or change.

Having examined reasons for causing the above problems, the present inventors obtained the following knowledge. That is, with respect to the solder having the eutectic composition, the solidification starts and terminates at the same temperature, the solidifying time period is short, and the metallic tissue of the solder layer is constituted by fine crystals. Accordingly, since no shrinkage cavity is formed in the solder layer having the eutectic composition, the solder layer having high strength can be obtained.

During the course of further improving the optical transmitting member-holding structure according to the second aspect of the present invention, the present inventors discovered the fact that as the temperature is lowered for solidifying the solder, the eutectic solder rapidly shrinks in a short time as shown by arrows A in FIG. 11, and solidifies while forming a dense metallic tissue. In that case, a void may be formed along the surface 117a of the holding substrate 17 or along the bottom surface 104a of the fixing substrate 104, if the solder is not sufficiently supplied.

Further, the inventors discovered the fact that the solder is difficult to enter a contact 140 near between the optical fiber 116 and the projection 120 in FIG. 11 particularly during the initial melting stage of the solder. In addition, since an open angle of a bottom portion 119 of each groove 118 is ordinarily relatively sharp, the bottom portion 119 is particularly difficult to be wetted with the solder. As a result, the solder is difficult to enter a tip of a possible solder layer between the optical fiber 116 and the bottom portion 119, so that a void defect as denoted by 141 may be formed. Such a void defect 141 may cause leakage of the inert gas.

At a point of time when the melting of the solder is finished, the optical fiber 116 is floated in the solder. At that time, the optical fiber 116 may be finally stopped at a location deviated from an intended one. In order to lessen such an erroneous deviation, it is necessary to decrease the thickness of the joining layer 121, that is, it is necessary to crush the solder as thin as possible. However, since there is not actually a space into which solder flows out, it is difficult to greatly thinly crush the solder.

In order to solve the above new problem, the present inventors contrived the formation of another solder layer having a composition different from that of the eutectic solder layer between the holding substrate and the eutectic solder layer and/or between the fixing substrate and the eutectic solder layer. This embodiment will be further explained below.

Figure 12:
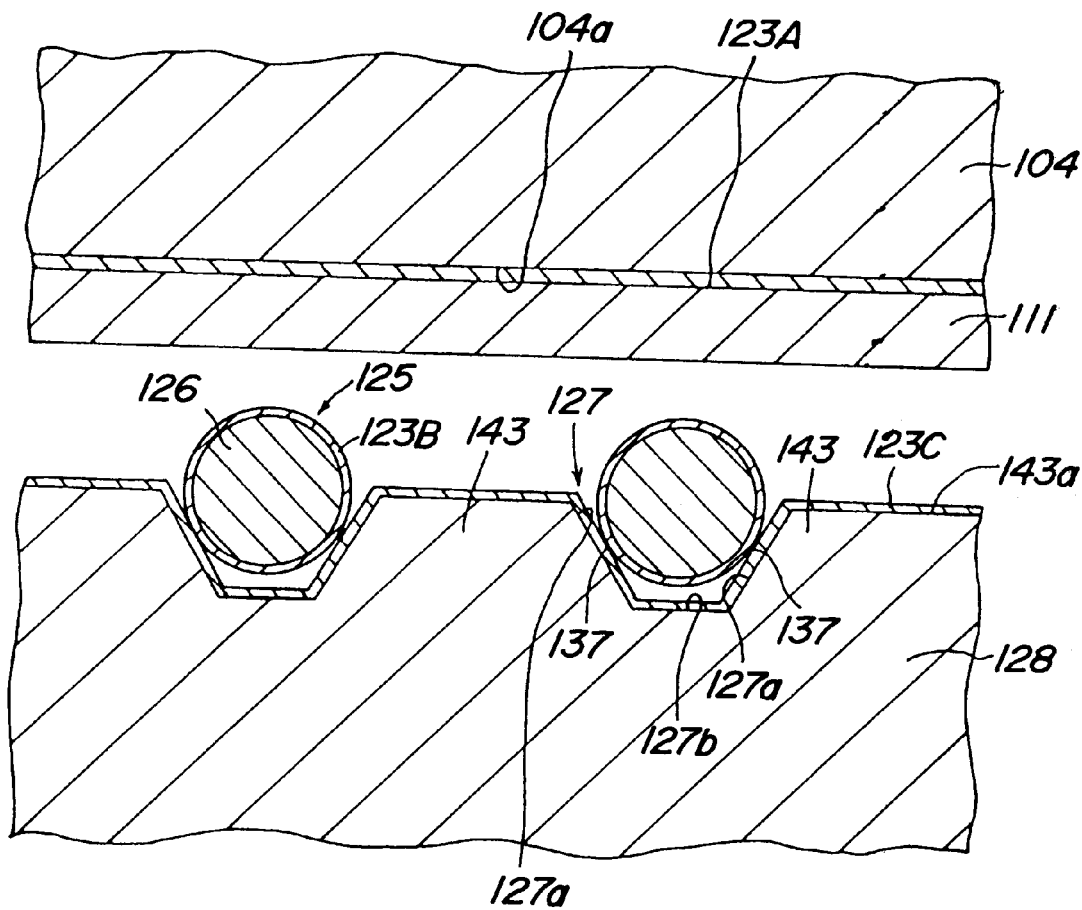
FIG. 12 is a sectional view showing a principal portion of an assembly before an optical fiber-holding structure according to another embodiment of the second aspect of the present invention in FIG. 13 is produced.

FIG. 11 is a sectional view showing a principal portion of another embodiment of the optical fiber-holding structure according to the second aspect of the present invention, and FIG. 12 a sectional view showing the holding structure of FIG. 11 before assembling.

Each of fixing grooves 127 of a holding substrate 128 has an almost trapezoidal cross-sectional shape, and includes straightly inclined surfaces 127a and a flat plane portion 127*b*. A projection 143 formed between the adjacent filing grooves 127 is provided with a flat plane 143*a*.

The holding substrate 128 may be made of silicon, a ceramic material or glass. Each filing groove 127 is very fine, for example, about 125 μm deep. Optical fibers 125 around which a metallizing layer is formed are placed and arrayed in the respective fixing grooves 127.

The fixing grooves 127 may be formed on the holding substrate 128 in the same manner as already mentioned. With respect to the materials to be used for the holding substrate, the explanation and discussion already made before are applicable here.

A metallizing layer 123C is formed on the surfaces 143*a* of the holding substrate 128, the inclined surfaces 127*a* and the flat surfaces 127*b* of the grooves. Further, a metallizing layer 23A is formed to cover the bottom surface 104*a* of the fixing substrate 104. Furthermore, a metallizing layer 23B is formed to cover the surface of a core wire 126 of each of the optical fibers.

At that time, at least a metal contained in the eutectic solder layer as a main ingredient may be preferably incorporated into the metallizing layers 123A, 123B and 123C. The main ingredient of the eutectic solder layer means a metallic component which amounts for not less than 50 weight % of the eutectic solder. For example, if the eutectic solder is a solder composed mainly of gold, for example, gold/tin solder, gold/germanium or gold/silicon solder, at least gold is preferably contained in the metallizing layer in the form of gold or an gold alloy.

The metallizing layer may be constituted by plural metallic layers, and an underlying layer of the metallizing layer may be made of a metal having excellent adhesion to the material of the holding substrate. In this case, it is preferable that a surface side layer of the metallizing layer is gold or a gold alloy.

In a particularly preferable embodiment, a two-ply metallizing layer composed of (1) a chromium layer/a gold layer or (2) a three-ply metallizing layer composed of a titanium layer/a platinum layer/a gold layer in this order as viewed from the surface side 143*a* of the holding substrate 128 is used. The entire thickness of the metallizing layer is preferable not more than 1.5 μm in that the positional precision in the optical axis of the optical fiber in the groove should be enhanced. On the other hand, the entire thickness of the metallizing layer is preferably not less than 0.5 μm in that the wettability should be improved. For example, a 0.1 μm-thick titanium layer, a 0.1 μm-thick platinum layer and a 1 μm-thick gold layer are successively laminated together.

Figure 13:
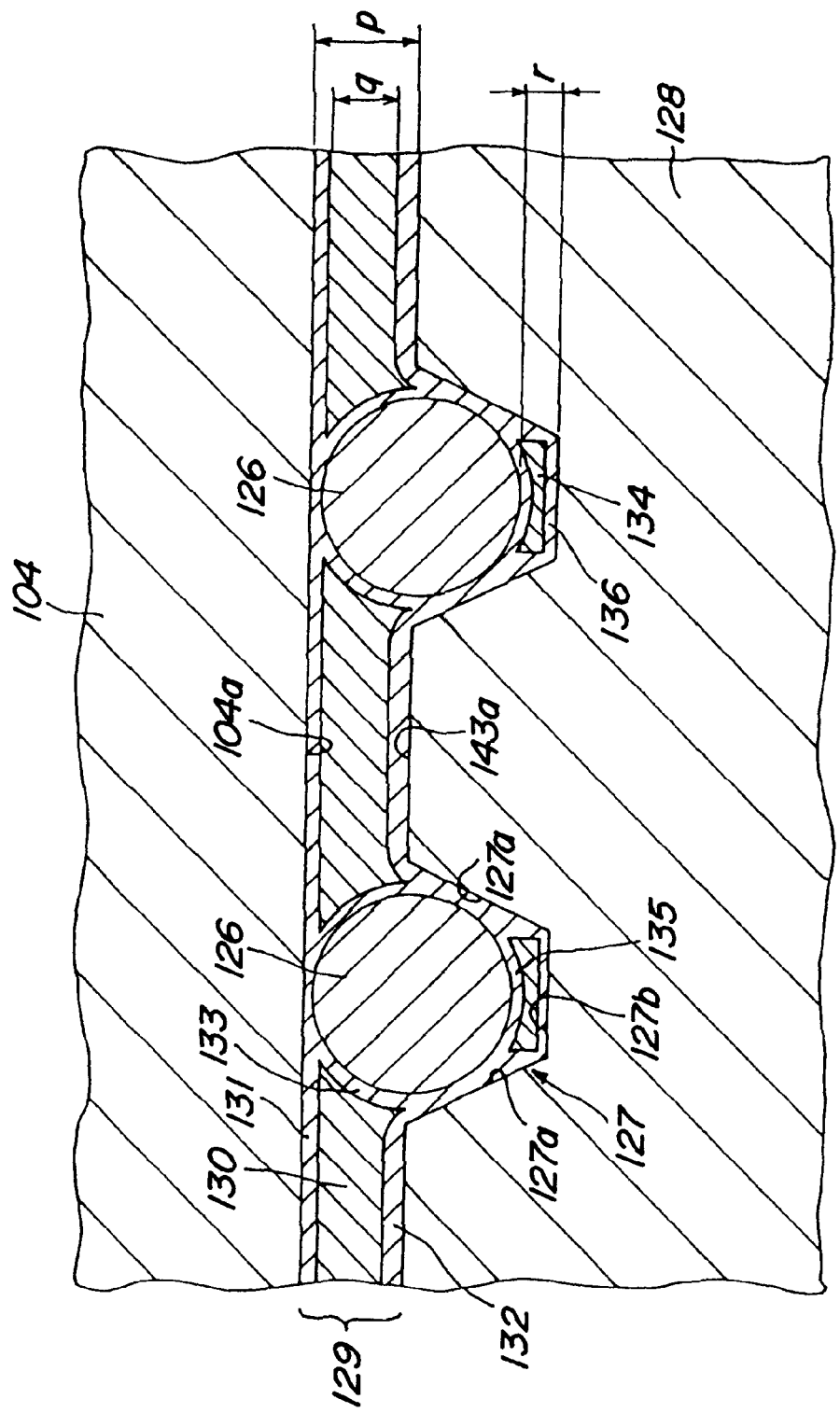
FIG. 13 is a sectional view showing a principal portion of the optical fiber-holding structure obtained from the assembly in FIG. 12.

When the solder is melted and flown in the assembly in FIG. 12, the holding structure shown in FIG. 13 is obtained. The reference numerals in FIG. 13 denote the parts shown in FIG. 12 by the same numerals. The solder 111 melts and flows onto the projections 143, and enters between the under side of the optical fibers 126 and the flat plane portions 127*b* along the inclined surfaces 127*a*.

As a result, as shown in FIG. 13, each optical fiber 126 is received in the corresponding fixing groove 127, and a part of the optical fiber 126 projects upwardly from the flat planes 143*a*. When the solder is solidified in this state, a joining layer 129 is formed between the holding substrate 128 and the fixing substrate 104. In the joining layer 129, the eutectic solder layer 130 is formed in a central portion. Solder layers 131 and 132 having the composition different from the eutectic composition are formed between the fixing substrate 104 and the eutectic solder layer 130 and between the eutectic solder layer 130 and the holding substrate 128, respectively. Further, a solder layer 133 having a composition different from the eutectic composition is formed between the eutectic solder layer 130 and the optical fiber 126.

When the holding structure has such a structure as mentioned above, a continuous void is difficult to be formed in the joining layer 129. The reason for this will be explained. According to this embodiment, when the melted eutectic solder is to solidify, solidification begins near from the interfaces between the eutectic solder and the metallizing layers 123A, 123B, 123C. For, the solder having the eutectic composition has a relatively low melting point, and begins to solidify more slowly, whereas since a metal component in the metallizing layer is mixed into the eutectic solder near the interface between the eutectic solder and the metallizing layer, the composition of the solder deviates from the eutectic composition to raise the solidifying point of the solder.

As a result, as the temperature decreases, the solder begins to solidify from near the interface between the eutectic solder layer and each metallizing layer, and solidifies gradually toward the central portion. Owing to this, the solder gradually solidifies near the surface of the holding substrate 128, the bottom surface 104*a* of the fixing substrate 104. and the surface of the optical fiber 126. That is, since the composition of the solder deviates from the eutectic composition there, the solidification-beginning temperature differs from the solidification-terminating temperature. Therefore, a state in which crystals produced at the solidification-beginning temperature and the non-solidified liquid coexist during a time period from the solidification-beginning to the solidification-termination is maintained.

In this state, as the temperature of the solder decreases, the solidified crystals continuously grow. Since a sufficient amount of the melt exists around the solidified crystals, such an amount of the melt as sufficient to supplement a volumetric reduction of the solder due to the solidification shrinkage is continuously supplied from the surrounding of the solidified crystals. In the solder layers 131, 132 and 133 formed by the above mechanism, a continuous void or gap is difficult to be formed.

In the final solidification stage of the solder, the eutectic solder solidifies at one time to form the eutectic solder layer 130. Although the solder is volumetrically shrunk in the eutectic solder layer 130 owing to the solidification, the shrinkage cavity which would be formed by this volumetric shrinkage is difficult to be continued. Consequently, since such a shrinkage cavity is formed in the form of a sealed space inside the eutectic solder layer 130, gas-tightness of the solder layer will not be deteriorated.

Further, the solder layers are formed as the solder flows among the optical fibers 126, the inclined surfaces 127*a* and the flat surfaces 127*b*. Between the optical fiber 126 and the flat surface 127*b* are formed the eutectic solder layer 134 and two solder layers 135, 136 having the composition different from the eutectic composition. Each of these solder layers has the function and effects as mentioned above.

In the above embodiment, the following function and effects are obtained. That is, since each optical fiber 126 is floated in the solder layer 129 when the melting of the solder is finished, the optical fiber 126 tends to be fixed at a place spaced from the bottom surface 104*a* of the fixing substrate 104 and a pair of the inclined surfaces 127*a* of the groove by an almost equal distance. According to the present embodiment, since the flat surface 143*a* is formed by removing the tip of each projection 143 and there is a space above the flat surface 143a into which the solder may flow, the distance between each of the optical fibers 126 and the bottom surface 104a of the fixing substrate can be made far smaller, for example, not more than 1 μm as compared with the embodiment in FIG. 11. Consequently, the deviation of the filing location of each of the optical fibers 126 can be made extremely small. With respect to the function and effects obtained by the feature that the top of each of V-shaped projections each defined between the adjacent V-shaped grooves has the flat surface 143a and each groove has the flat surface 127b at the bottom portion, the same explanation and discussion made in connection with the embodiment shown in FIGS. 8 to 10 are applicable.

In addition, since the flat surface 127b is provided in the fixing groove 127 at the bottom side, the bottom portion of the fixing groove 127 is also easily wettable with the solder so that a void 141 may be difficult to be formed in the fixing groove unlike in FIG. 11. By so doing, a thin solder layer having an almost uniform thickness is formed between the optical fiber 126 and the projection 143.

With respect to limitations to be posed upon the width of the flat surface 127b in the fixing groove 127 and the depth of the fixing groove 127, the same explanation and discussion as given in connection with the embodiment shown in FIGS. 6 to 10 are also applicable to this embodiment in FIGS. 12 and 13.

In this embodiment, since each optical fiber 126 is assuredly pressed against the inclined surfaces 127a of the fixing groove and the bottom surface 104a of the fixing substrate 104, the precision in arraying the optical fibers is ensured, and this embodiment has performance sufficient for uses in which single mode optical fibers or the like are to be arranged at a high precision.

In the optical transmitting member-holding structure according to the second aspect of the present invention, the solder is preferably charged over the entire upper surface of the holding substrate 117, 128 after the fixing substrate 104 is joined to the holding substrate with the solder. By so doing, the gas-tightness between the upper surface of the holding substrate and the bottom surface 104a of the fixing substrate 104 is maintained. Therefore, the optical transmitting member-holding structure according to the second aspect of the present invention is particularly suitable for the optical parts having the structure in which the gas-tightness of the package is held by the optical transmitting member-holding structure itself.

Figure 14:
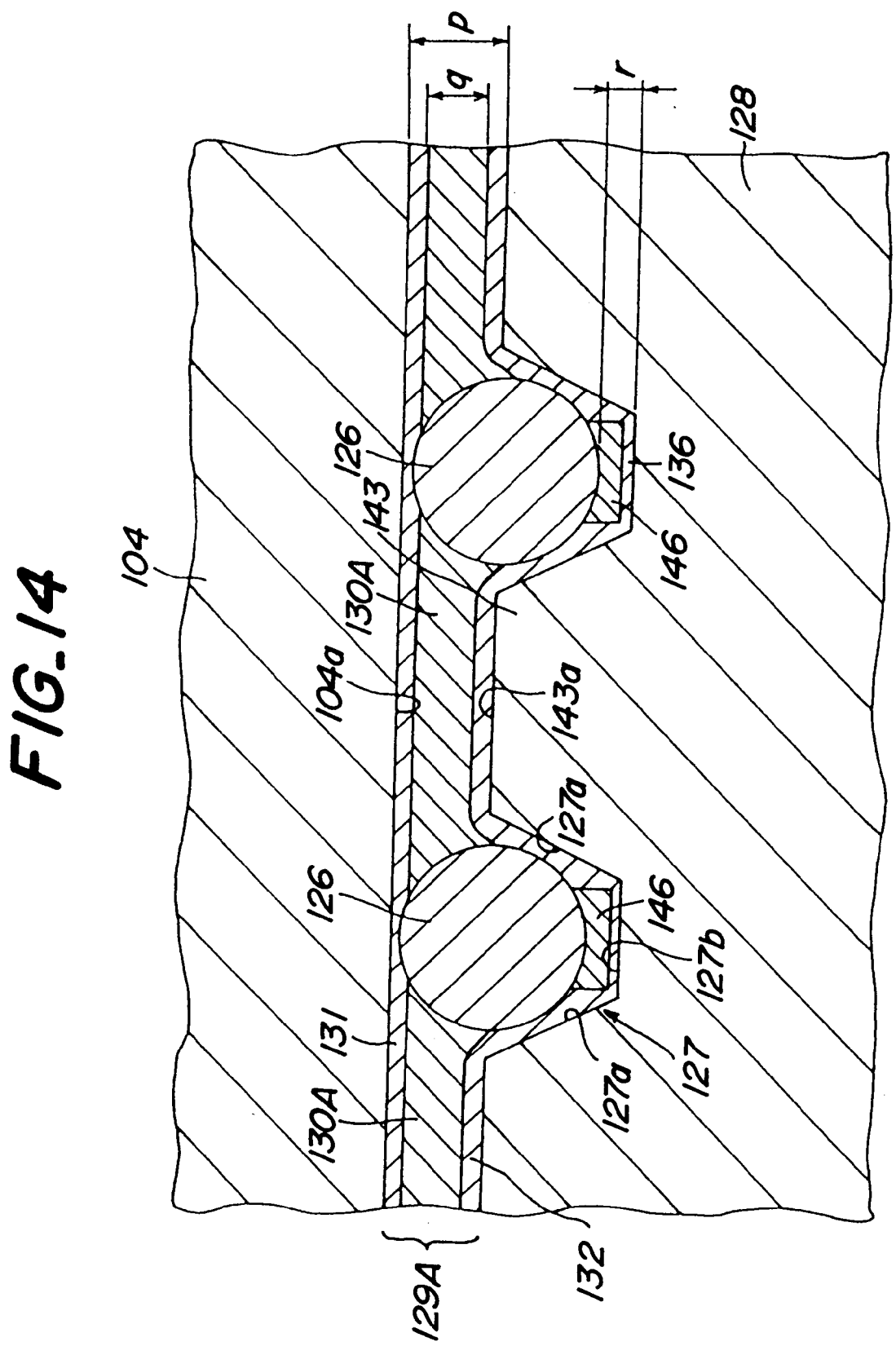
FIG. 14 is a sectional view showing a principal portion of an optical fiber-holding structure according to still another embodiment of the second aspect of the present invention.

FIG. 14 is a sectional view showing a principal portion of another embodiment of the optical transmitting member-holding structure according to the second aspect of the present invention. This embodiment is almost the same as that shown in FIG. 13 except that no metallizing layer is formed around the surface of each of the optical fibers 126. Owing to this, each of the optical fibers 126 contacts eutectic solder layers 130A and 146 or exists extremely near thereto.

Even in such a holding structure, since solder layers 131 and 132 each having a composition different from the eutectic composition are formed between a fixing substrate 104 and an eutectic solder layer 130A and between a holding substrate 128 and the eutectic solder layer 130A, the above-mentioned function and effects can be fundamentally exhibited. Further, although the solder layers are indeed volumetrically shrunk as the eutectic solder solidifies, a void is difficult to be formed around the outer periphery of the optical fiber 126 because the eutectic solder surrounding the optical fiber 126 tends to shrink toward the optical fiber 126.

However, it is preferable to form the metallizing layer around the surface of the optical transmitting member such as the optical fiber. The reasons for this have been already recited in connection with the embodiment illustrated in FIGS. 2 to 5.

FIGS. 13 and 14 show that each of the metallizing layers 123A, 123B and 123C (See FIG. 12) has almost disappeared through reaction with the eutectic solder, however as a matter of course a part of the metallizing layers 123A, 123B and 123C may remain.

The thickness "p" of the joining layer 129 is preferably not less than 10 μm. For, since the eutectic solder 111 reacts with the metallizing layers, each of a distance between the fixing substrate 104 and the eutectic solder layer 130, 130A and a distance between the holding substrate and the eutectic solder layer is usually about 3–5 μm. For this reason, in order to certainly produce the eutectic solder layer, the thickness "p" is preferably not less than 10 μm, and more preferably not less than 20 μm. On the other hand, the thickness "p" is preferably not more than 100 μm from the standpoint that the optical fibers 126 must be fixed at their given locations.

The thickness "q" of the eutectic solder layer 130, 130A is preferably not less than 10 μm from the standpoint that the gas-tightness and the mechanical strength of the eutectic solder must be excellently exhibited. On the other hand, the thickness "q" is preferably not more than 90 μm from the standpoint that the optical fibers 126 must be fixed at their given locations.

For the same reason as mentioned above, the distance "r" between the optical fiber 126 and the flat plane 127b is preferably not less than 10 μm but not more than 35 μm.

FIG. 15(a) is a front view outlining an entire optical fiber-holding structure as a preferred embodiment of the second aspect of the present invention, FIG. 15(b) is a plane view outlining this holding structure, and FIG. 15(c) is a side view of the holding structure in FIG. 15(b) as viewed from the left side.

This optical fiber-holding structure 101 includes an optical fiber-holding substrate 103 with a covering-placing portion 103a and an optical fiber-holding portion 103b, optical fibers, and a fixing substrate 105. These constituent parts are assembled and integrally fixed in the same manner as explained in connection with the embodiment shown in FIGS. 1(a) to 1(c) in the state that coverings 102 of the optical fibers are fixed in the covering-placing portion 103a, whereas core wires 108 of the optical fibers are placed in a given number of grooves 107 formed on the holding portion 103b of the holding substrate 103.

In order to produce such an optical fiber-holding structure as shown in FIGS. 15(a) to 15(c), as shown in FIG. 16, first a given number of the grooves 107 each having a trapezoidal sectional shape are formed on a holding portion 103b of a holding substrate 103, and core wires 108 of the optical fibers are placed in the respective grooves 107. In this embodiment, reference numerals 110, 113 and 114 denote an upper face of the holding portion 103, and an inner end portion and a side face of the holding portion 103b, respectively.

With respect to the open angle of each groove, a tool such as a grinding stone or a method to be used to form the grooves, the distance and the pitch between the adjacent grooves or the optical fibers, the number of the optical fiber in the optical fiber-holding structure according to the second aspect of the present invention, the explanation and discussion as made in connection with the embodiment shown in FIGS. 1(a) to 1(c) are also applicable to that shown in FIGS. 15(a) to 15(c). Therefore, such explanation and discussion are omitted here to avoid duplication.

Figure 18:
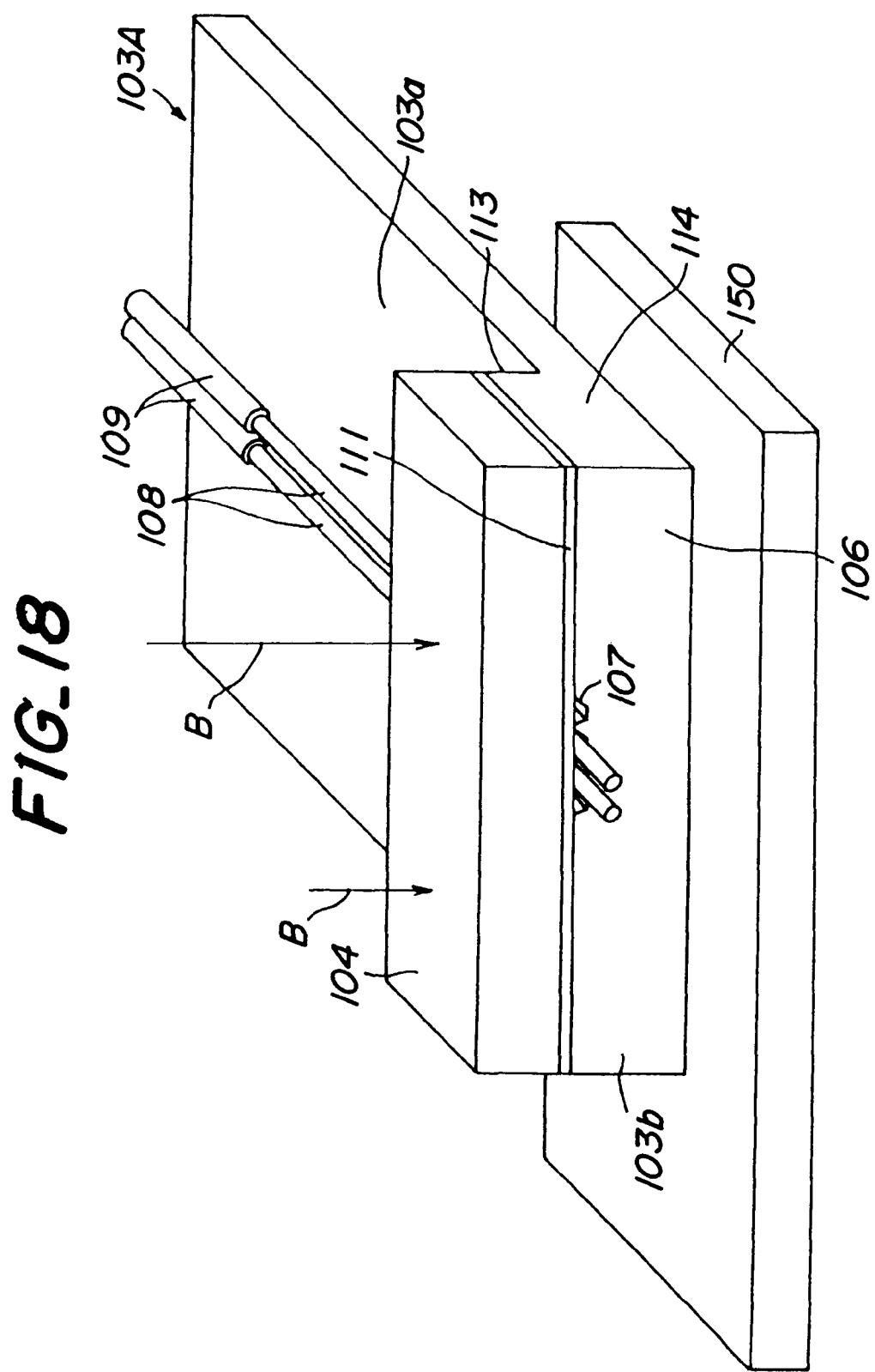
FIG. 18 is a perspective view showing the state that the fixing substrate 104 is placed on the core wires of the optical fibers as a lid.

Next, as shown in FIG. 17, a sheet 111 of solder is placed above the upper surface 110 of the holding portion 103b to cover the grooves 107 and the core wires 108 of the optical fibers received therein. The fixing substrate 104 is placed on the solder sheet 111. Then, as shown in FIG. 18, the holding substrate 103A is placed on a given heating source (for example, a hot plate 150), and at least the solder sheet 111 is heated. In this case, it is preferable that the at least solder sheet 111 is heated under application of pressure upon the fixing substrate from the upper side as shown by an arrow B as in the method according to the first aspect of the present invention.

Figure 19:
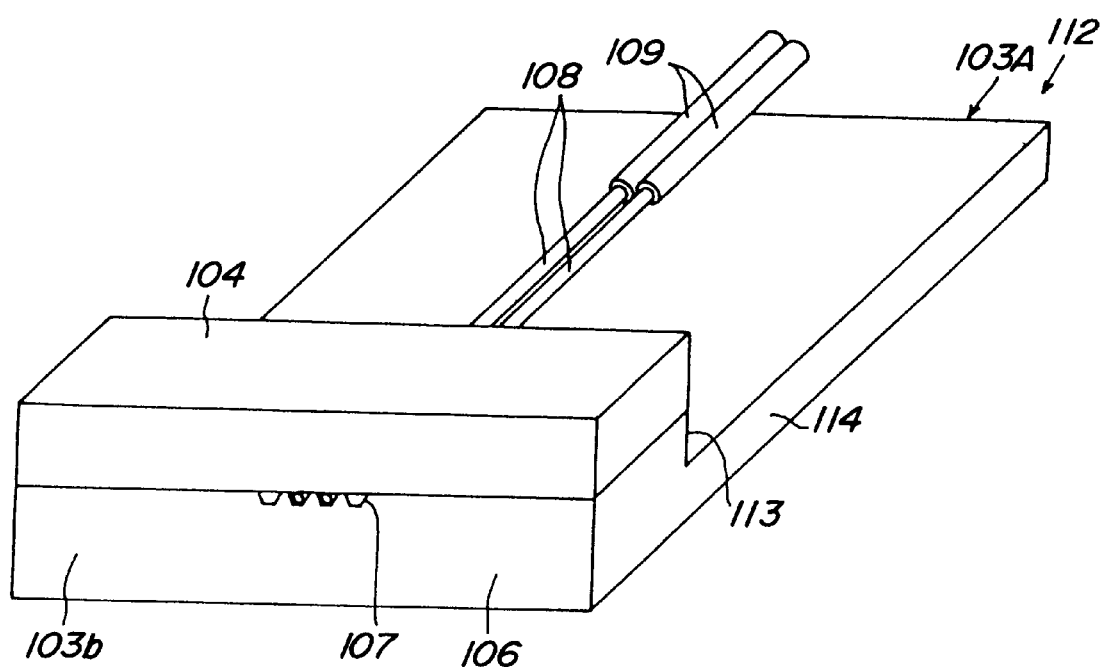
FIG. 19 is a perspective view showing an outward appearance of an optical fiber-holding structure 112 after joining between the holding substrate and the fixing substrate is finished.

The entire holding structure is removed from the hot plate after the heat treatment, thereby obtaining the holding structure 112 as shown in FIG. 19. Then, an end face of the core wire 108 of each of the optical fibers is optically polished, and said each end face is exposed to the end face 106 of the holding portion 103b.

As mentioned above, it is preferable to pressurize the solder sheet 111 by downwardly pressing the fixing substrate 104 as shown by the arrow B, because pressure can be applied uniformly over the entire surface of the solder sheet.

Then, the solder needs be melted by heating ordinarily at about 250° C. to about 400° C. If the core wires of the optical fibers are held on the holding substrate while the coverings of the optical fibers are not held on the holding substrate, no substantial problem occurs when the entire holding substrate is placed in a furnace and heated there at 250° C. to 400° C. For example, the entire holding structure can be heated in a case of producing a buried type optical fiber-holding structure in which optical fibers are fitted into the fixing grooves only.

However, if the core wires and the coverings of the optical fibers are held on the holding substrate (for example, in a case of a pig-tail type optical fiber array), any countermeasure must be so taken that the coverings may not be melted. For this purpose, the same countermeasure as mentioned in connection with the embodiment shown in FIGS. 2 to 5 may be taken.

Further, if the solder is oxidized during heating, the solder is difficult to wet the metallizing layer and the optical fiber. Therefore, it is preferable that at least the solder sheet is held in an inert atmosphere during heating. However, as mentioned above, if the holding substrate is placed on the hot plate to locally heat only the holding portion for the core wires of the optical fibers, it is difficult to keep the entire surrounding of the holding substrate in the inert atmosphere. For this reason, an inert gas, preferably nitrogen gas, is desirably continuously blown, at least during heating the solder sheet, upon the entire zone of the portion of the holding substrate to be locally heated.

The solder sheet-heating temperature is particularly preferably set at not less than (the eutectic point of the solder +20° C.) and not more than (the eutectic point of the solder +50° C.). The reasons for this have been already explained in connection with the embodiment shown in FIGS. 2 to 5. If the solder is gold/germanium solder (eutectic point: 356° C.), the working temperature is most appropriately around 390° C.

According to the second aspect of the present invention, it is preferable to apply a load upon the solder sheet toward the optical transmitting member(s) during heating. If no load is applied, there may be possibility that when the solder sheet is melted, the location of each optical transmitting member is not fixed, and the optical transmitting member readily moves in the molten solder.

In order to assuredly crush the solder sheet and press the optical transmitting members against the V-shaped grooves during heating, the load is preferably set not less than 500 g/cm². In order to prevent adverse effect of the load upon the optical transmitting member, the load is preferably not more than 2500 g/cm².

As the configuration of the solder, a rod-shaped solder or the like may be used besides the sheet-shaped solder. However, in the above embodiments in which the solder is to be sandwiched between the holding substrate and the fixing substrate, the sheet-shaped solder 11 is preferred.

In order to produce the optical transmitting structure according to the second aspect of the present invention, a method may be employed in which an eutectic solder having a composition such as Au/Sn, Au/Ge or Au/Si is first melted in a vessel made of SUS or the like, an optical transmitting member-carried array temporarily assembled is immersed in the melted eutectic solder, and the melted solder is charged into a gap between the holding substrate and the filing substrate.

In the following, more specific experimental results will be explained.

An optical fiber-holding structure shown in FIG. 13 was produced according to the method as explained with reference to FIGS. 12 to 19. At that time, gold/germanium solder (eutectic point: 356° C.) was used. A working temperature in soldering was set at 390° C. As each of metallizing layers 123A, 123B and 123C, a layer formed by successively laminating a 0.1 μm thick titanium layer, a 0.1 μm thick platinum layer and a 1 μm thick gold layer was used. As an optical fiber, an optical fiber made of quartz, 125 μm in diameter was used. The thickness of a solder sheet 111 was set at 50 μm. The thickness "p" as defined in FIG. 13 was set at 35 μm, and "q" and "r" were set at 20 μm and 10 μm, respectively.

Figure 20:
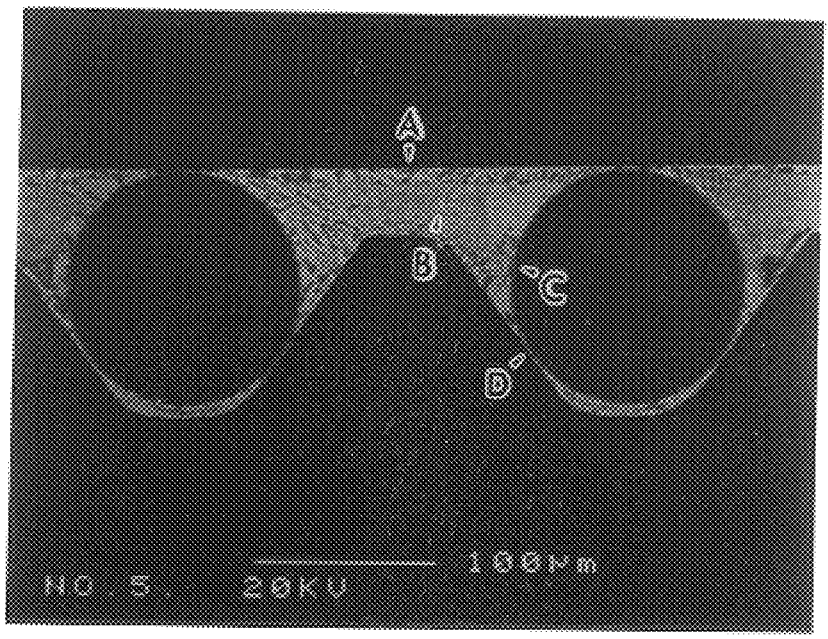
FIG. 20 is a sectional micrograph obtained by photographing a joining layer between the fixing substrate and the holding substrate in the same view as in FIG. 13.
Figure 21:
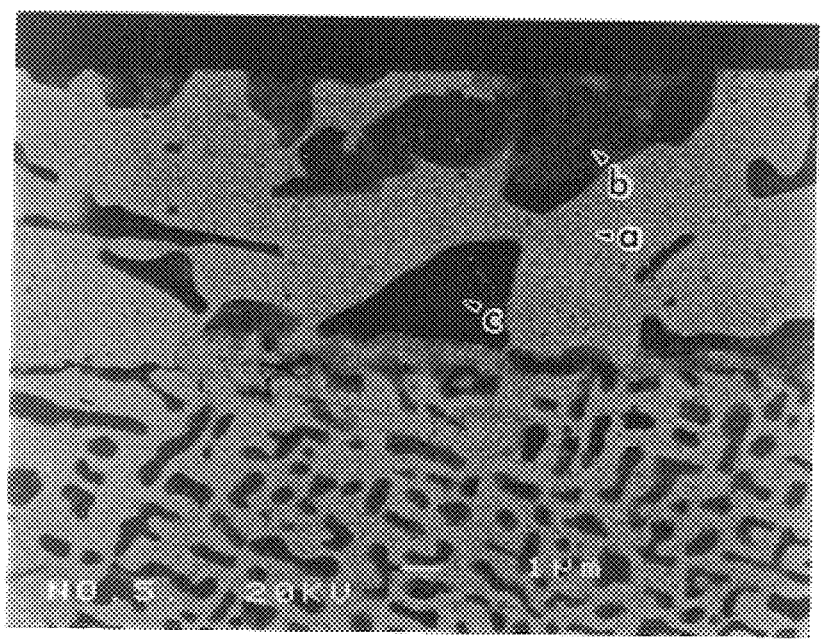
FIG. 21 is a micrograph showing an A portion in FIG. 10 in an enlarge scale.
Figure 22:
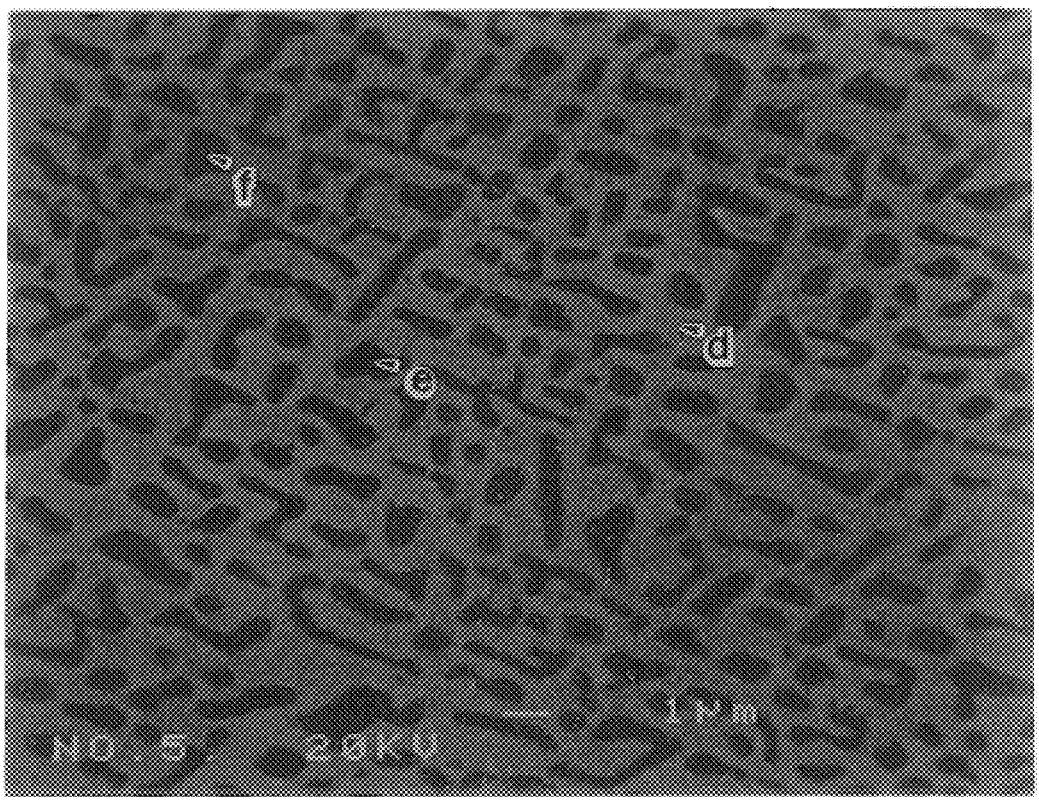
FIG. 22 is a micrograph showing a B portion in FIG. 10 in an enlarge scale.

Micrographs of the thus obtained optical fiber-holding structure are shown in FIGS. 20 to 22. FIG. 20 is a sectional micrograph obtained by photographing the optical fiber-holding structure in the same view as in FIG. 13. In FIG. 20, A, C and D denote the solder having a composition other than an eutectic one, whereas B denotes the solder having the eutectic composition. FIG. 21 is a micrograph showing a portion at A in an enlarged scale, in which an upper side is the solder having the composition other than the eutectic one, whereas the lower side is the solder having the eutectic composition. FIG. 22 is a micrograph showing a portion at B in an enlarged scale.

The solder at A other than the eutectic one had the composition of Au: 90–93% and Ge: 1–7%. The solder at B had the eutectic composition of Au: 88% and Ge: 12%.

In FIG. 21, "a" denotes gold crystal grains, and "b" and "c" do germanium crystal grains. On the other hand, in FIG. 22, "d" denotes gold crystal grains, and "e" and "f" do germanium crystal grains. The crystal grains "b" and "c" have the diameter of 4 to 6 μm, whereas the crystal grains "e" and "f" have the diameter of around 1 μm. In FIG. 22, it is seen that the grain diameters are small due to eutectic crystallization.

Corrosion starts from germanium crystal grains floaing in gold as nuclei. The inventors' knowledge clarified that the greater the crystal diameter of the germanium grains, the more easily corrodible the joining layer according to a binary series manner. If the eutectic phenomenon is not utilized at all, the entire solder phase 129 is in the state as shown by A in FIG. 20. The diameter of the germanium crystal grains naturally increases beyond that of the crystal grains shown at "b" and "c" in FIG. 21 by an amount which is not limited by the eutectic portion.

As mentioned above, according to the second aspect of the present invention, the optical transmitting member-holding structure is provided favorably against corrosion by maximizing the eutectic portion while minimizing the non-eutectic portion.

As mentioned above, according to the second aspect of the present invention, in the holding structure for fixing the optical transmitting member(s) such as the optical fibers at the fixed location(s) thereof, increase in the transmission loss between each optical transmitting member and the external optical element and decrease in the amount of light transmitted can be prevented, and strength of the holding structure can be enhanced.

What is claimed is:

1. An optical transmitting member-holding structure for holding an optical transmitting member at a given location, said holding structure comprising a holding substrate including at least one V-shaped groove for receiving an optical transmitting member, said V-shaped groove including a gold-containing, non-eutectic solder layer on substantially the entire surface thereof, an optical transmitting member placed within said V-shaped groove, a fixing substrate covering the optical transmitting member on the holding substrate, and a joining layer joining the holding substrate and the fixing substrate and fixing the optical transmitting member at said given location, said joining layer comprising an eutectic gold-based solder layer.

2. The optical transmitting member-holding structure set forth in claim 1, wherein a thickness of the joining layer is not less than 10 μm and not more than 90 μm.

3. The optical transmitting member-holding structure set forth in claim 1, wherein a flat surface is provided at a bottom portion of said V-shaped groove.

4. The optical transmitting member-holding structure set forth in claim 1, which comprises at least two optical transmitting members and at least two corresponding V-shaped grooves provided on said holding substrate and in which said at least two optical transmitting members are placed, respectively, and openings of adjacent grooves being spaced from each other by a flat surface.

5. The optical transmitting member-holding structure set forth in claim 1, wherein said holding substrate and said fixing substrate are fixed together and the optical transmitting member is fixed at said given location with said joining layer by heating under application of pressure upon said joining layer between said holding substrate and said fixing substrate.

6. An optical transmitting member-holding structure for holding an optical transmitting member at a given location, said holding structure comprising a holding substrate including at least one V-shaped groove for receiving an optical transmitting member, said V-shaped groove including a gold-containing, non-eutectic solder layer on substantially the entire surface thereof, an optical transmitting member placed within said V-shaped groove, a fixing substrate covering the optical transmitting member on the holding substrate, said fixing substrate including a gold-containing, non-eutectic solder layer on a surface thereof that opposes said holding substrate, and a joining layer joining the holding substrate and the fixing substrate and fixing the optical transmitting member at said given location, said joining layer comprising an eutectic gold-based solder layer.

7. The optical transmitting member-holding structure set forth in claim 6, wherein a thickness of the joining layer is not less than 10 μm and not more than 90 μm.

8. The optical transmitting member-holding structure set forth in claim 6, wherein a flat surface is provided at a bottom portion of said V-shaped groove.

9. The optical transmitting member-holding structure set forth in claim 6, which comprises at least two optical transmitting members and at least two corresponding V-shaped grooves provided on said holding substrate and in which said at least two optical transmitting members are placed, respectively, and openings of adjacent grooves being spaced from each other by a flat surface.

10. The optical transmitting member-holding structure set forth in claim 6, wherein said holding substrate and said fixing substrate are fixed together and the optical transmitting member is fixed at said given location with said joining layer by heating under application of pressure upon said joining layer between said holding substrate and said fixing substrate.

11. An optical transmitting member-holding structure for holding an optical transmitting member at a given location, said holding structure comprising a holding substrate including at least one V-shaped groove for receiving an optical transmitting member, said V-shaped groove including a gold-containing, non-eutectic solder layer on substantially the entire surface thereof, an optical transmitting member placed within said V-shaped groove, said optical transmitting member including a gold-containing, non-eutectic solder layer on an outer surface thereof, a fixing substrate covering the optical transmitting member on the holding substrate, and a joining layer joining the holding substrate and the fixing substrate and fixing the optical transmitting member at said given location, said joining layer comprising an eutectic gold-based solder layer.

12. The optical transmitting member-holding structure set forth in claim 11, wherein a thickness of the joining layer is not less than 10 μm and not more than 90 μm.

13. The optical transmitting member-holding structure set forth in claim 11, wherein a flat surface is provided at a bottom portion of said V-shaped groove.

14. The optical transmitting member-holding structure set forth in claim 11, which comprises at least two optical transmitting members and at least two corresponding V-shaped grooves provided on said holding substrate and in which said at least two optical transmitting members are placed, respectively, and openings of adjacent grooves being spaced from each other by a flat surface.

15. The optical transmitting member-holding structure set forth in claim 12, wherein said holding substrate and said fixing substrate are fixed together and the optical transmitting member is fixed at said given location with said joining layer by heating under application of pressure upon said joining layer between said holding substrate and said fixing substrate.

* * * * *

UNITED STATES PATENT AND TRADEMARK OFFICE
CERTIFICATE OF CORRECTION

PATENT NO. : 6,195,495 B1
DATED : February 27, 2001
INVENTOR(S) : Takashi Ota, Masashi Fukuyama, Hironori Kurimoto It is certified that error appears in the above-identified patent and that said Letters Patent is hereby corrected as shown below:

<u>Title page,</u>
Item [56] References Cited

FOREIGN PATENT DOCUMENTS

Please change "61-273502 12/1996 (JP)" to -- 61-273502 12/1986 (JP) --

Signed and Sealed this

Thirtieth Day of October, 2001

Attest:

NICHOLAS P. GODICI
Attesting Officer — Acting Director of the United States Patent and Trademark Office